US012621132B2

(12) United States Patent
Ma et al.

(10) Patent No.: US 12,621,132 B2
(45) Date of Patent: May 5, 2026

(54) CLOUD-EDGE COLLABORATION METHOD AND SYSTEM, APPARATUS, CLOUD PLATFORM, DEVICES, AND MEDIUM

(71) Applicant: BOE Technology Group Co., Ltd., Beijing (CN)

(72) Inventors: Xitong Ma, Beijing (CN); Tao Li, Beijing (CN); Congrui Wu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 287 days.

(21) Appl. No.: 18/281,964

(22) PCT Filed: Jan. 3, 2023

(86) PCT No.: PCT/CN2023/070036
§ 371 (c)(1),
(2) Date: Sep. 14, 2023

(87) PCT Pub. No.: WO2023/142903
PCT Pub. Date: Aug. 3, 2023

(65) Prior Publication Data
US 2024/0154793 A1 May 9, 2024

(30) Foreign Application Priority Data
Jan. 27, 2022 (CN) .......................... 202210100322.8

(51) Int. Cl.
*G06F 21/60* (2013.01)
*G06F 21/64* (2013.01)
(Continued)

(52) U.S. Cl.
CPC ............ *H04L 9/0838* (2013.01); *G06F 21/64* (2013.01); *H04L 9/3263* (2013.01)

(58) Field of Classification Search
CPC ... H04L 9/0838; H04L 9/3263; H04L 9/0894; H04L 67/10; H04L 63/0428; H04L 67/1097; G06F 21/64; G06F 21/602
See application file for complete search history.

(56) References Cited

U.S. PATENT DOCUMENTS

| 11,423,161 B1 * | 8/2022 | Racz .................... H04W 12/033 |
| 11,652,816 B1 * | 5/2023 | Griffin ................ G06F 16/9535 |
| | | 713/168 |

(Continued)

FOREIGN PATENT DOCUMENTS

| CN | 107819854 A | 3/2018 |
| CN | 108255605 A | 7/2018 |

(Continued)

OTHER PUBLICATIONS

International Search Report for PCT/CN2023/070036 Mailed Feb. 22, 2023.

(Continued)

*Primary Examiner* — Andrew Suh
(74) *Attorney, Agent, or Firm* — Ling Wu; Stephen Yang; Ling and Yang Intellectual Property

(57) ABSTRACT

A cloud-edge collaboration method is provided, a data transmission apparatus, a cloud platform, an edge device, a cloud-edge collaboration system, an electric device, and a computer readable medium. The cloud-edge collaboration method includes: receiving first information sent by an edge device, the first information at least comprising image feature information of an image to be recognized; determining whether a local feature library comprises reference feature information matching the image feature information; if the local feature library includes reference feature information matching the image feature information, generating (Continued)

a first determination result, and sending the first determination result to the edge device.

17 Claims, 10 Drawing Sheets

(51) Int. Cl.

| | |
|---|---|
| *H04L 9/08* | (2006.01) |
| *H04L 9/32* | (2006.01) |
| *H04L 9/40* | (2022.01) |
| *H04L 67/10* | (2022.01) |
| *H04L 67/1097* | (2022.01) |

(56) References Cited

U.S. PATENT DOCUMENTS

| | | | | |
|---|---|---|---|---|
| 2008/0043278 | A1* | 2/2008 | Suzuki | G06F 21/608 |
| | | | | 358/1.15 |
| 2011/0202377 | A1* | 8/2011 | Maiya | G06Q 10/063 |
| | | | | 705/14.51 |
| 2014/0172707 | A1* | 6/2014 | Kuntagod | G06Q 20/3224 |
| | | | | 705/44 |
| 2014/0195815 | A1* | 7/2014 | Taveau | G06F 21/32 |
| | | | | 713/186 |
| 2015/0365232 | A1* | 12/2015 | Yang | H04L 9/3231 |
| | | | | 380/286 |
| 2019/0012450 | A1* | 1/2019 | Hou | G06F 21/32 |
| 2019/0342083 | A1* | 11/2019 | LeSaint | H04L 9/14 |
| 2019/0363904 | A1* | 11/2019 | Drake | H04L 63/0442 |
| 2021/0273914 | A1* | 9/2021 | Cobb | H04L 63/0435 |
| 2022/0239639 | A1* | 7/2022 | Jasleen | G06F 21/36 |
| 2023/0155825 | A1* | 5/2023 | Wu | G06F 21/32 |
| | | | | 380/44 |
| 2023/0388127 | A1* | 11/2023 | Chang | H04L 9/0894 |
| 2023/0422031 | A1* | 12/2023 | Liao | H04L 9/30 |
| 2025/0030545 | A1* | 1/2025 | Okamoto | G06F 21/32 |

FOREIGN PATENT DOCUMENTS

| | | |
|---|---|---|
| CN | 108509493 A | 9/2018 |
| CN | 110430266 A | 11/2019 |
| CN | 111027089 A | 4/2020 |
| CN | 111125409 A | 5/2020 |
| CN | 111698470 A | 9/2020 |
| CN | 111797693 A | 10/2020 |
| CN | 112257500 A | 1/2021 |
| CN | 113114626 A | 7/2021 |
| CN | 113792691 A | 12/2021 |
| CN | 114500536 A | 5/2022 |
| EP | 3629212 A1 | 4/2020 |
| WO | 2021151279 A1 | 8/2021 |

OTHER PUBLICATIONS

Zhang, Lei et al., "MEC-based Cloud-Edge Collaboration Scenario Analysis", 5G Network Innovation Seminar(2021), Oct. 13, 2021, pp. 283-287.

You, Weijing et al., "An Intel SGX-based Proof of Encryption in Clouds", Netinfo Security, 2020, 20(12): 1-8.

\* cited by examiner

The cloud platform receives a first information ciphertext sent by the edge device —S210

The cloud platform decrypts the first information ciphertext to obtain the first information —S220

Determine whether there is reference feature information that matches the image feature information in the cloud feature library —S230

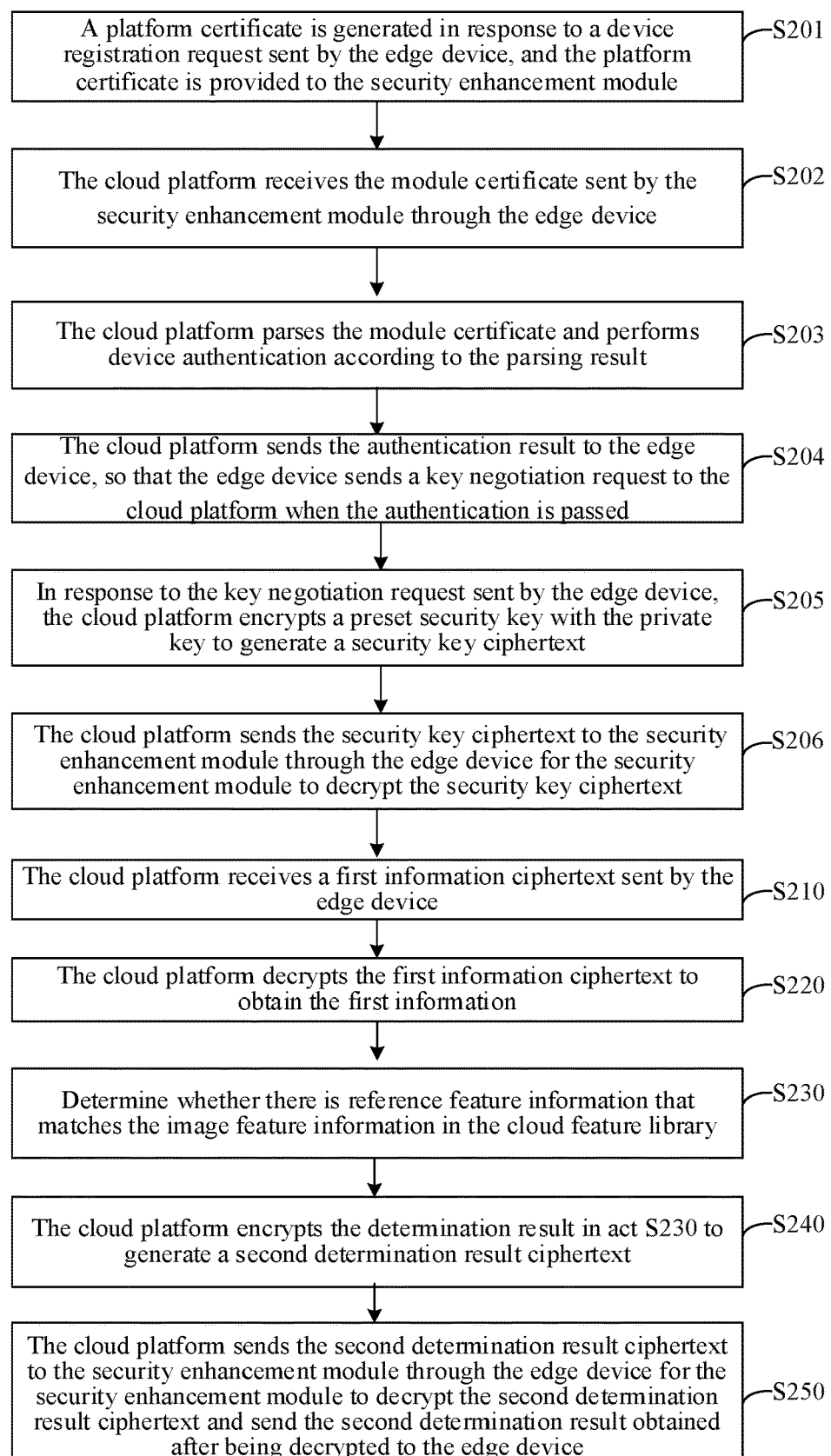

A platform certificate is generated in response to a device registration request sent by the edge device, and the platform certificate is provided to the security enhancement module — S201

The cloud platform receives the module certificate sent by the security enhancement module through the edge device — S202

The cloud platform parses the module certificate and performs device authentication according to the parsing result — S203

The cloud platform sends the authentication result to the edge device, so that the edge device sends a key negotiation request to the cloud platform when the authentication is passed — S204

In response to the key negotiation request sent by the edge device, the cloud platform encrypts a preset security key with the private key to generate a security key ciphertext — S205

The cloud platform sends the security key ciphertext to the security enhancement module through the edge device for the security enhancement module to decrypt the security key ciphertext — S206

The cloud platform receives a first information ciphertext sent by the edge device — S210

The cloud platform decrypts the first information ciphertext to obtain the first information — S220

Determine whether there is reference feature information that matches the image feature information in the cloud feature library — S230

The cloud platform encrypts the determination result in act S230 to generate a second determination result ciphertext — S240

The cloud platform sends the second determination result ciphertext to the security enhancement module through the edge device for the security enhancement module to decrypt the second determination result ciphertext and send the second determination result obtained after being decrypted to the edge device — S250

FIG. 5

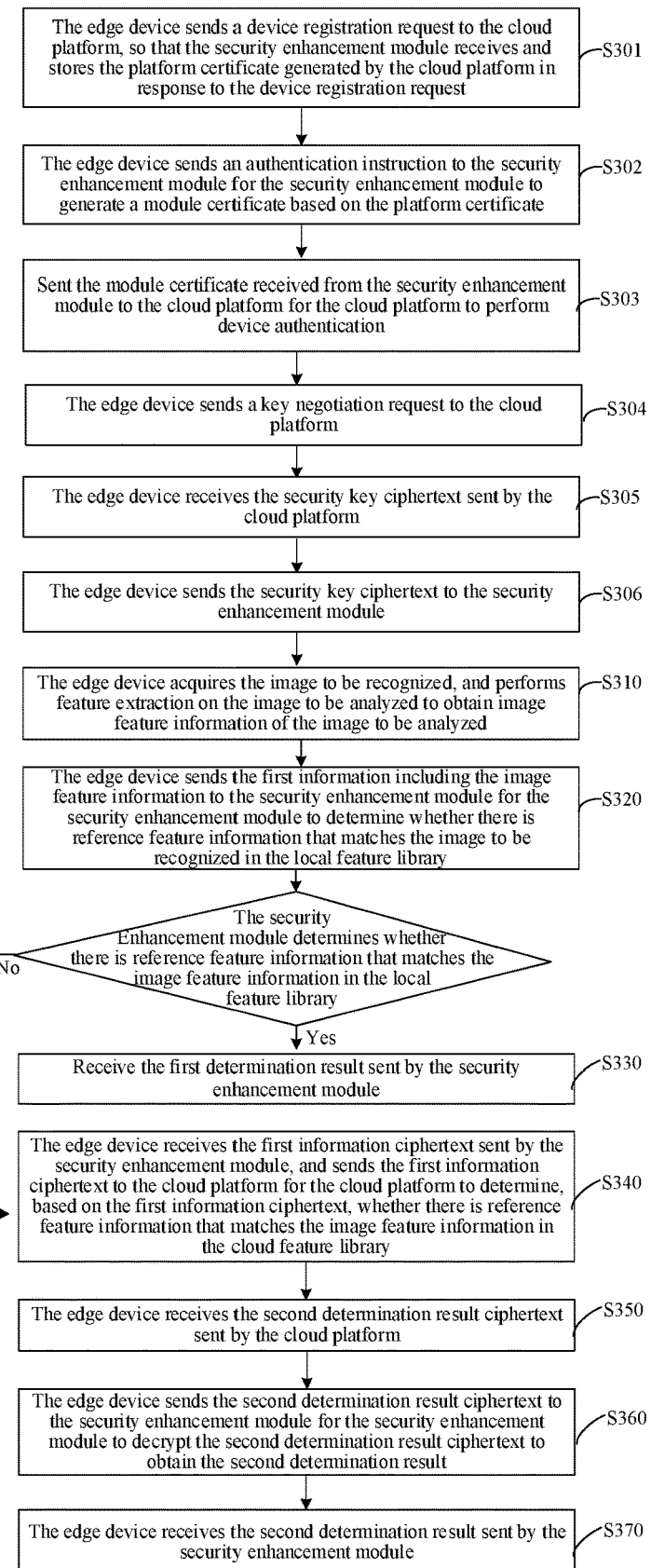

The edge device sends a device registration request to the cloud platform, so that the security enhancement module receives and stores the platform certificate generated by the cloud platform in response to the device registration request ⌐S301

The edge device sends an authentication instruction to the security enhancement module for the security enhancement module to generate a module certificate based on the platform certificate ⌐S302

Sent the module certificate received from the security enhancement module to the cloud platform for the cloud platform to perform device authentication ⌐S303

The edge device sends a key negotiation request to the cloud platform ⌐S304

The edge device receives the security key ciphertext sent by the cloud platform ⌐S305

The edge device sends the security key ciphertext to the security enhancement module ⌐S306

The edge device acquires the image to be recognized, and performs feature extraction on the image to be analyzed to obtain image feature information of the image to be analyzed ⌐S310

The edge device sends the first information including the image feature information to the security enhancement module for the security enhancement module to determine whether there is reference feature information that matches the image to be recognized in the local feature library ⌐S320

The security Enhancement module determines whether there is reference feature information that matches the image feature information in the local feature library No Yes Receive the first determination result sent by the security enhancement module ⌐S330

The edge device receives the first information ciphertext sent by the security enhancement module, and sends the first information ciphertext to the cloud platform for the cloud platform to determine, based on the first information ciphertext, whether there is reference feature information that matches the image feature information in the cloud feature library ⌐S340

The edge device receives the second determination result ciphertext sent by the cloud platform ⌐S350

The edge device sends the second determination result ciphertext to the security enhancement module for the security enhancement module to decrypt the second determination result ciphertext to obtain the second determination result ⌐S360

The edge device receives the second determination result sent by the security enhancement module ⌐S370

FIG. 7

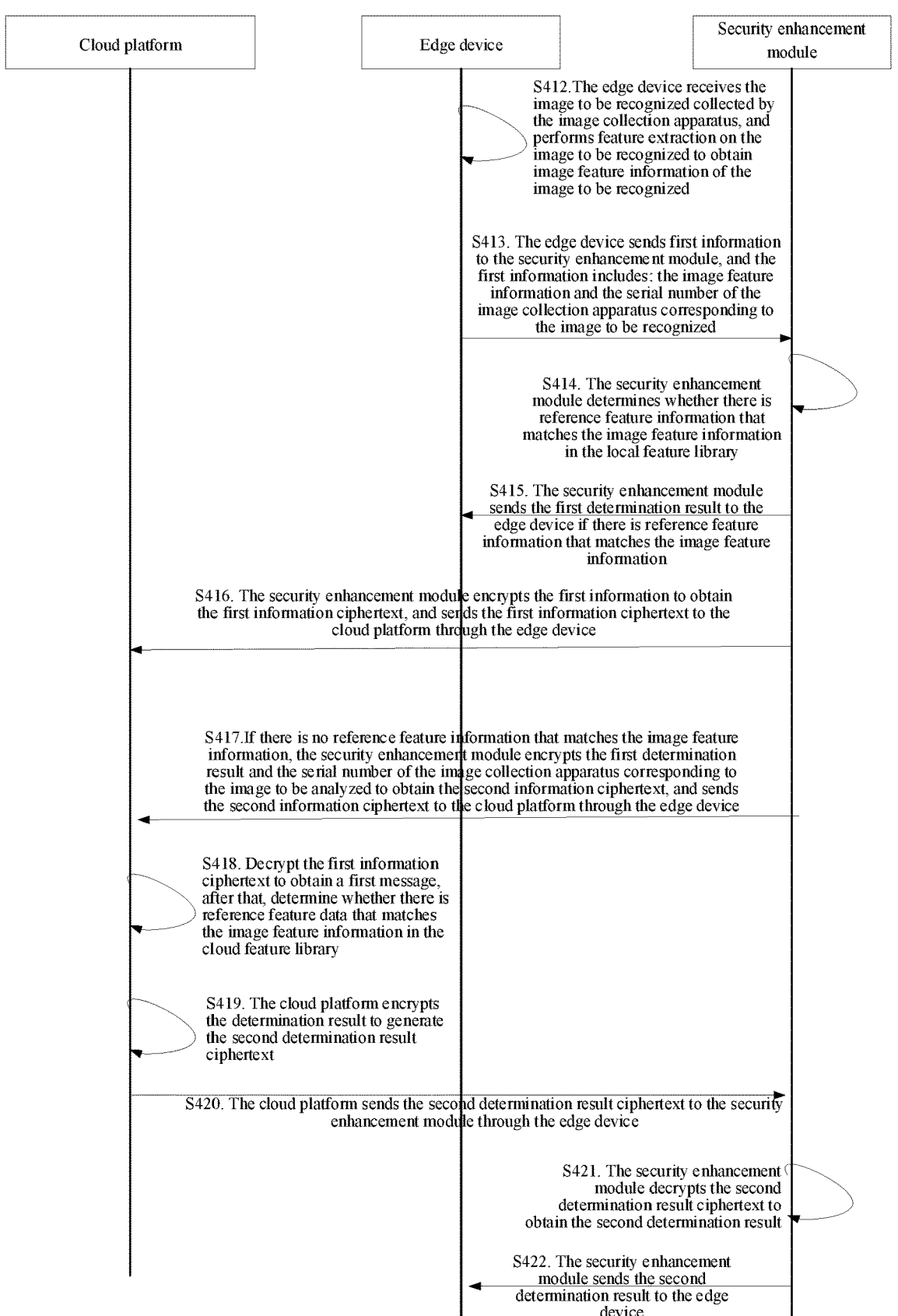

| Cloud platform | Edge device | Security enhancement module |
|---|---|---|

S412.The edge device receives the image to be recognized collected by the image collection apparatus, and performs feature extraction on the image to be recognized to obtain image feature information of the image to be recognized S413. The edge device sends first information to the security enhancement module, and the first information includes: the image feature information and the serial number of the image collection apparatus corresponding to the image to be recognized S414. The security enhancement module determines whether there is reference feature information that matches the image feature information in the local feature library S415. The security enhancement module sends the first determination result to the edge device if there is reference feature information that matches the image feature information S416. The security enhancement module encrypts the first information to obtain the first information ciphertext, and sends the first information ciphertext to the cloud platform through the edge device S417.If there is no reference feature information that matches the image feature information, the security enhancement module encrypts the first determination result and the serial number of the image collection apparatus corresponding to the image to be analyzed to obtain the second information ciphertext, and sends the second information ciphertext to the cloud platform through the edge device S418. Decrypt the first information ciphertext to obtain a first message, after that, determine whether there is reference feature data that matches the image feature information in the cloud feature library S419. The cloud platform encrypts the determination result to generate the second determination result ciphertext S420. The cloud platform sends the second determination result ciphertext to the security enhancement module through the edge device S421. The security enhancement module decrypts the second determination result ciphertext to obtain the second determination result S422. The security enhancement module sends the second determination result to the edge device

FIG. 9

CLOUD-EDGE COLLABORATION METHOD AND SYSTEM, APPARATUS, CLOUD PLATFORM, DEVICES, AND MEDIUM

CROSS-REFERENCE TO RELATED APPLICATIONS

The present application is a U.S. National Phase Entry of International Application No. PCT/CN2023/070036 having an international filing date of Jan. 3, 2023, which claims priority of Chinese Patent Application No. 202210100322.8, filed to the CNIPA on Jan. 27, 2022 and entitled "Cloud-Edge Collaboration Method and System, Apparatus, Cloud Platform, Devices, and Medium". The above-identified applications are hereby incorporated by reference.

TECHNICAL FIELD

The present disclosure relates to the field of computer technologies, and particularly, to a cloud edge collaboration method, a data transmission apparatus, a cloud platform, an edge device, a cloud edge collaboration system, an electronic device and a computer readable medium.

BACKGROUND

With the evolution and maturity of Internet of Things, 5G, digital twinning, edge cloud computing, artificial intelligence and other technologies, the whole era is gradually advancing towards digitalization, networking and intelligence currently. The centralized data processing method centered on the cloud computing model is increasingly difficult to meet the data processing requirements generated by massive terminals, with the vigorous promotion of industrial Internet (IoT), the edge computing market is extremely hot while cloud-edge collaboration is also gradually moving from concept to maturity.

SUMMARY

In a first aspect, the present disclosure provides a cloud edge collaboration method, which is applied to a security enhancement module, wherein, the method includes: receiving first information sent by an edge device, wherein the first information includes at least image feature information of an image to be recognized; judging whether there is reference feature information that matches the image feature information in a local feature library; generating a first determination result and sending the first determination result to the edge device when there is reference feature information that matches the image to be recognized in the local feature library; when there is no reference feature information that matches the image feature information in the local feature library, encrypting the first information to obtain a first information ciphertext, and sending the first information ciphertext to a cloud platform through the edge device for the cloud platform to determine, based on the first information ciphertext, whether there is reference feature information that matches the image feature information in a cloud feature library.

In some embodiments, after sending the first information ciphertext to the cloud platform through the edge device, the method further includes: receiving a second determination result ciphertext sent by the edge device, the second determination result ciphertext is sent to the edge device by the cloud platform after the cloud platform encrypts a second determination result; the second determination result is a determination result of the cloud platform judging whether there is reference feature information that matches the image feature information in the cloud feature library; decrypting the second determination result ciphertext to obtain the second determination result and sending the second determination result to the edge device.

In some embodiments, before receiving the first information sent by the edge device, the method further includes: performing key negotiation with the cloud platform to obtain a security key; encrypting the first information to obtain the first information ciphertext, which specifically includes: encrypting the first information using the security key to obtain the first information ciphertext; decrypting the second determination result ciphertext to obtain the second determination result, which specifically includes: decrypting the second determination result ciphertext with the security key to obtain the second determination result.

In some embodiments, performing key negotiation with the cloud platform specifically includes: receiving a security key ciphertext sent by the edge device, wherein, the security key ciphertext is generated and sent to the edge device by the cloud platform after the cloud platform encrypts the security key with its private key; decrypting the security key ciphertext with a public key of the cloud platform to obtain the security key.

In some embodiments, before performing key negotiation with the cloud platform, the method further includes: receiving and storing a platform certificate generated by the cloud platform in response to a device registration request; generating a module certificate based on the platform certificate in response to an authentication instruction sent by the edge device, and sending the module certificate to the edge device for the edge device to send the module certificate to the cloud platform for device authentication; wherein, the performing key negotiation with the cloud platform to obtain a security key specifically includes: performing key negotiation with the cloud platform to obtain the security key under the condition that the device authentication is passed.

In some embodiments, determining whether there is reference feature information that matches the image feature information in the local feature library specifically includes: determining a similarity between the image feature information and each reference feature information in the local feature library; determining whether the maximum value of all similarities is greater than or equal to a first preset threshold; if so, determining that there is reference feature information that matches the image feature information in the local feature library, and if not, determining that there is no reference feature information that matches the image feature information in the local feature library.

In some embodiments, the edge device is connected with a plurality of image collection apparatuses, and the image feature information includes: image feature information obtained by feature extraction of an image to be recognized collected by any of the image collection apparatuses, and the first information further includes: a serial number of the image collection apparatus having collected the image to be recognized; when there is reference feature information that matches the image to be recognized in the local feature library, the method further includes: encrypting the first determination result and the serial number of the image collection apparatus corresponding to the image to be analyzed to obtain a second information ciphertext, and sending the second information ciphertext to the cloud platform through the edge device.

In a second aspect, the present disclosure provides a cloud edge collaboration method applied to a cloud platform, wherein the method includes: receiving a first information ciphertext sent by an edge device, the first information ciphertext is generated and sent to the edge device by a security enhancement module after encrypting the first information when the security enhancement module determines that there is no reference feature information that matches the image feature information in a local feature library, and the first information at least includes the image feature information; decrypting the first information ciphertext to obtain the first information; determining whether there is reference feature information that matches the image feature information in a cloud feature library.

In some embodiments, after determining whether there is reference feature information that matches the image feature information in the cloud feature library, the method further includes: encrypting the determination result to generate a second determination result ciphertext; sending the second determination result ciphertext to the security enhancement module through the edge device for the security enhancement module to decrypt the second determination result ciphertext and send the second determination result obtained after being decrypted to the edge device.

In some embodiments, before receiving the first information ciphertext sent by an edge device, the method further includes: in response to a key negotiation request sent by the edge device, encrypting a preset security key with a private key to generate a security key ciphertext; sending the security key ciphertext to the security enhancement module through the edge device for the security enhancement module to decrypt the security key ciphertext; wherein, the key used for decrypting the first information ciphertext is the security key.

In some embodiments, before responding to a key negotiation request sent by the edge device, the method further includes: generating a platform certificate in response to a device registration request sent by the edge device, and providing the platform certificate to the security enhancement module; receiving a module certificate sent by the security enhancement module through the edge device; parsing the module certificate and performing device authentication according to the parsing result.

In some embodiment, the method further includes: receiving module status information sent by the edge device, the module status information is used to represent whether the security enhancement mode is online or not.

In some embodiments, determining whether there is reference feature information that matches the image feature information in a cloud feature library specifically including: determining a similarity between the image feature information and each reference feature information in the cloud feature library; determining whether the maximum value of all similarities is greater than or equal to a second preset threshold; if so, determining that there is reference feature information that matches the image feature information in the cloud feature library; if not, determining that there is no reference feature information that matches the image feature information in the cloud feature library.

In a third aspect, the present disclosure provides a cloud edge collaboration method applied to an edge device, wherein the method includes: acquiring an image to be recognized, extracting features of the image to be analyzed, and obtaining image feature information of the image to be analyzed; sending a first information including the image feature information to a security enhancement module for the security enhancement module to determine whether there is reference feature information that matches the image to be recognized in a local feature library; receiving a first determination result sent by the security enhancement module when the security enhancement module determines that there is reference feature information that matches the image to be recognized in the local feature library; when the security enhancement module determines that there is no reference feature information that matches the image to be recognized in the local feature library, receiving a first information ciphertext sent by the security enhancement module, and sending the first information ciphertext to a cloud platform for the cloud platform to determine, based on the first information ciphertext, whether there is reference feature information that matches the image feature information in a cloud feature library.

In some embodiments, after sending the first information ciphertext to the cloud platform, the method further includes: receiving a second determination result ciphertext sent by the cloud platform; wherein, the second determination result ciphertext is generated by the cloud platform according to the determination result when the cloud platform determines whether there is reference feature information that matches the image feature information in the cloud feature library; sending the second determination result ciphertext to the security enhancement module; receiving a second determination result sent by the security enhancement module; wherein, the second determination result is obtained by decrypting the second determination result ciphertext by the security enhancement module.

In some embodiments, prior to the acquiring the image to be recognized, the method further includes: sending a key negotiation request to the cloud platform; receiving a security key ciphertext sent by the cloud platform, wherein, the security key ciphertext is generated by the cloud platform after the cloud platform responds to the key negotiation request and encrypts the security key with its private key; sending the security key ciphertext to the security enhancement module for the security enhancement module to decrypt the security key ciphertext with a public key of the cloud platform to obtain the security key, and the security key is used for encrypting the first information and decrypting the second determination result ciphertext.

In some embodiments, before sending a key negotiation request to the cloud platform, the method further includes: sending a device registration request to the cloud platform so that the security enhancement module receives and stores a platform certificate generated by the cloud platform in response to the device registration request; sending an authentication instruction to the security enhancement module for the security enhancement module to generate a module certificate based on the platform certificate; sending the module certificate received from the security enhancement module to the cloud platform for the cloud platform to perform device authentication.

In some embodiment, the method further includes: detecting the status of the security enhancement module in real time, and sending module status information to the cloud platform according to the status of the security enhancement module, and the module status information is used to represent whether the security enhancement mode is online or not.

In a fourth aspect, the present disclosure provides a data transmission apparatus including: a first receiving module configured to receive first information sent by an edge device, wherein the first information includes at least image feature information of an image to be recognized; a first determination module configured to determine whether there is reference feature information that matches the image feature information in a local feature library; a sending module configured to generate a first determination result when there is reference feature information that matches the image to be recognized in the local feature library, and send the first determination result to the edge device; when there is no reference feature information that matches the image feature information in the local feature library, encrypt the first information to obtain a first information ciphertext, and send the first information ciphertext to a cloud platform through the edge device for the cloud platform to determine, based on the first information ciphertext, whether there is reference feature information that matches the image feature information in a cloud feature library.

In a fifth aspect, the present disclosure provides a cloud platform including: a second receiving module configured to receive a first information ciphertext sent by an edge device, the first information ciphertext is generated and sent to the edge device by a security enhancement module after encrypting the first information when the security enhancement module determines that there is no reference feature information that matches the image feature information in a local feature library, and the first information at least includes the image feature information; an encryption and decryption module configured to decrypt the first information ciphertext to obtain the first information; a second determination module configured to determine whether there is reference feature information that matches the image feature information in a cloud feature library.

In a sixth aspect, the present disclosure provides an edge device including: an image acquisition module configured to acquire an image to be recognized and perform feature extraction on the image to be analyzed to obtain image feature information of the image to be analyzed; a transceiver module configured to send a first information including the image feature information to a security enhancement module for the security enhancement module to determine whether there is reference feature information that matches the image to be recognized in a local feature library; and receive a first determination result sent by the security enhancement module when the security enhancement module determines that there is reference feature information that matches the image to be recognized in the local feature library; when the security enhancement module determines that there is no reference feature information that matches the image to be recognized in the local feature library, receive a first information ciphertext sent by the security enhancement module, and send the first information ciphertext to a cloud platform for the cloud platform to determine, based on the first information ciphertext, whether there is reference feature information that matches the image feature information in a cloud feature library.

In a seventh aspect, the present disclosure provides a cloud edge collaboration system, including: the data transmission apparatus, the cloud platform and the edge device described above.

In an eighth aspect, the present disclosure provides an electronic device including: one or more processors; a memory having one or more programs stored thereon, which, when executed by the one or more processors, cause the one or more processors to implement the method described above; one or more I/O interfaces connected between the processors and the memory and configured to enable information interaction between the processors and the memory.

In a ninth aspect, the present disclosure provides a computer-readable medium having stored thereon a computer program that, when the computer program is executed by a processor, the method described above is implemented.

BRIEF DESCRIPTION OF DRAWINGS

Accompanying drawings are provided to provide a further understanding of the present disclosure, constitute a part of the specification, and together with the following detailed implementation modes, are used for explaining the present disclosure, but do not constitute limitations on the present disclosure. In the drawings:

FIG. 5 is a schematic diagram of a cloud edge collaboration method provided in other embodiments of the present disclosure.

FIG. 7 is a schematic diagram of a cloud edge collaboration method provided in other embodiments of the present disclosure.

FIG. 9 is a schematic diagram of an image recognition process.

DETAILED DESCRIPTION

To enable those skilled in the art to better understand technical solutions of the present disclosure, the present disclosure is described in further detail below in conjunction with the accompanying drawings and specific implementations.

Unless otherwise defined, technical terms or scientific terms used in the present disclosure should have the meanings as commonly understood by those of ordinary skill in the art that the present disclosure belongs to. "First", "second", and a similar term used in the present disclosure do not indicate any order, quantity, or importance, but are only used for distinguishing different components. Similarly, similar words such as "a", "an" or "the" do not denote a limitation on quantity, but rather denote the presence of at least one. "Include", "contain", or similar words mean that elements or objects appearing before the words cover elements or objects listed after the words and their equivalents, but do not exclude other elements or objects. "Connection", "mutual connection", or a similar term is not limited to a physical or mechanical connection, but may include an electrical connection, whether direct or indirect. "Upper", "lower", "left", "right", and the like, are only used for representing relative positional relationships, and when an absolute position of a described object is changed, the relative positional relationships may also be correspondingly changed.

In the existing cloud-edge interaction system, sensitive information such as face images will be processed in edge devices and transmitted between edge devices and the cloud-edge interaction system, but this transmission mode is easy to cause leakage of sensitive information.

Figure 1:
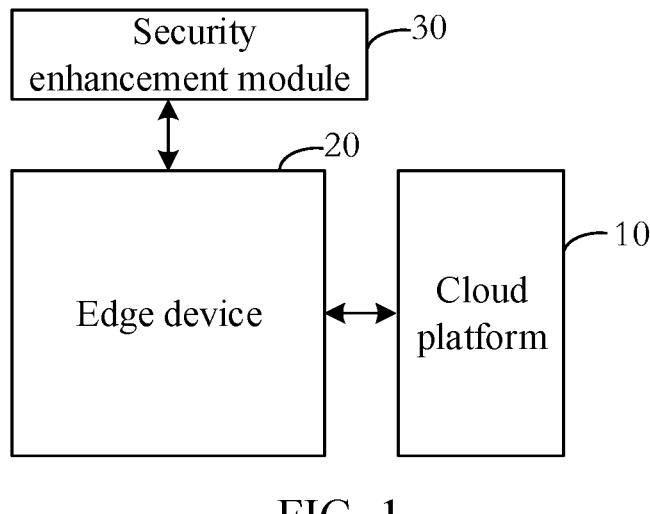
FIG. 1 is a schematic diagram of an application scenario of an embodiment of the present disclosure.

FIG. 1 is a schematic diagram of an application scenario of an embodiment of the present disclosure. As shown in FIG. 1, the cloud edge collaboration system includes a cloud platform 10, an edge device 20 and a security enhancement module 30. The security enhancement module 30 can communicate with the edge device 20 in various ways. The security enhancement module 30 can be connected to the edge device 20 in a wired or wireless manner. In an alternative implementation mode, in order to enhance the flexibility of setting the security enhancement module 30, the security enhancement module 30 is plugged into the edge device 20 in a pluggable manner to enable mutual communication. For example, the security enhancement module 30 may be connected to the edge device 20 via a USB interface or may be connected to the edge device 20 via an internal data bus such as PICE/LVDS/I2C/UART, etc. For another example, in another implementation mode, the security enhancement module 30 may be inserted into the edge device 20 as a security chip (FPGA), thereby connecting to the SOC (System on Chip) through an internal data bus, thereby communicating with the edge device 20. In summary, the present disclosure does not limit the specific access form of the security enhancement module 30 as long as the purpose of flexible and convenient communication with the edge device 20 can be achieved.

The edge device 20 communicates with the cloud platform 10 through a first protocol, and communicates with the security enhancement module 30 through a second protocol. In the embodiment of the present disclosure, the description is made by taking the first protocol as an MQTT protocol and the second protocol as a USB protocol as an example. Among them, MQTT (Message Queuing Telemetry Transport) is a non-encrypted protocol based on TCP, is a messaging protocol based on publish/subscribe paradigm under the ISO standard (ISO/IEC PRF 20922), which operates on the TCP/IP protocols family, and is a publish/subscribe-type messaging protocol designed for remote devices with low hardware performance and in the case of a bad network condition, and for this purpose, a messaging middleware is needed. MQTT is a client-server based message publish/subscribe transport protocol. The MQTT protocol is lightweight, simple, open and easy to implement, and these characteristics make it suitable for a wide range of applications, in many situations, including constrained environments, such as machine-to-machine (M2M) communication and Internet of Things (IoT). Among them, it has been widely used in sensors communicating via satellite links, medical devices with occasional dialing, smart homes, and some miniaturized devices.

In the embodiment of the present disclosure, the security enhancement module 30 is introduced into the cloud edge collaborative system, sensitive data such as a local feature library can be stored in the security enhancement module 30, and feature comparison can be carried out inside the security enhancement module 30 without sending the sensitive data to the edge device 20, thus preventing the leakage of the sensitive data.

Figure 2:
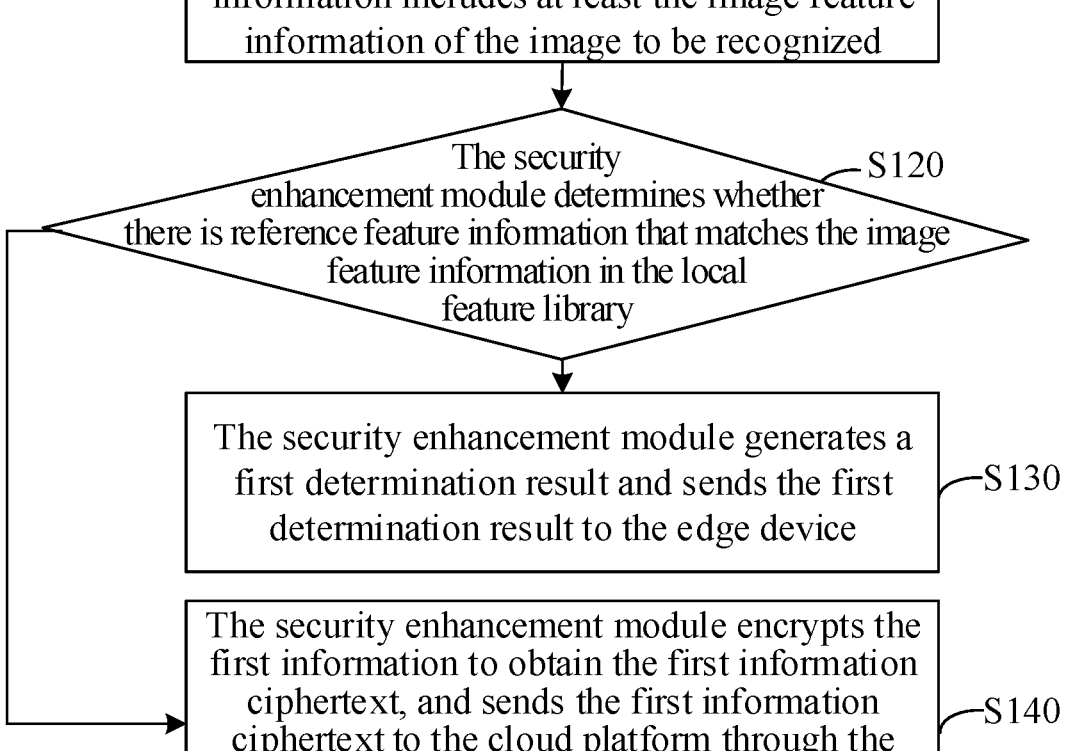
FIG. 2 is a schematic diagram of a cloud edge collaboration method provided in some embodiments of the present disclosure.

FIG. 2 is a schematic diagram of a cloud edge collaboration method provided in some embodiments of the present disclosure. The cloud edge collaboration method shown in FIG. 2 can be applied to the security enhancement module, and the local feature library can be stored in the security enhancement module, and a large number of reference feature information can be included in the local feature library. As shown in FIG. 2, the cloud edge collaboration method includes following operations.

S110, the security enhancement module receives first information sent by the edge device, the first information includes at least the image feature information of the image to be recognized.

Among them, the image to be recognized can be a face image, or other images such as a fingerprint image or an iris image. The image to be recognized may be collected by an image collection apparatus connected to the edge device and sent to the edge device. The image feature information can be obtained by the edge device after feature extraction of the image to be recognized.

In some examples, the edge device may be connected with one image collection apparatus or may be connected with a plurality of image collection apparatuses. When the edge device is connected with a plurality of image collection apparatuses, the first information may include the serial number of the image collection apparatus corresponding to the image to be recognized in addition to the image feature information of the image to be recognized, that is, for characterizing which image collection apparatus sent the image to be recognized to the edge device.

S120, the security enhancement module determines whether there is reference feature information that matches the image feature information in the local feature library, if so, act S130 is executed, and otherwise, act S140 is executed.

Herein, the reference feature information that matches the image to be recognized can be the reference feature information whose similarity with the image feature information exceeds a certain threshold.

S130, the security enhancement module generates a first determination result and sends the first determination result to the edge device.

Among them, the first determination result is the information used to represent whether there is reference feature information that matches the image feature information in the local feature library, and the first determination result can be sent to the edge device in plaintext form for the edge device to perform subsequent operations. The following will introduce the subsequent operations of the edge device in combination with specific application scenarios, which will not be repeated here.

S140, the security enhancement module encrypts the first information to obtain the first information ciphertext, and sends the first information ciphertext to the cloud platform through the edge device for the cloud platform to determine whether there is reference feature information that matches the image feature information in the cloud feature library based on the first information ciphertext.

Herein, the security enhancement module can perform key negotiation with the cloud platform in advance to obtain a security key, and in act S140, the first information can be encrypted with the security key; after the cloud platform receives the first message ciphertext, it can decrypt the first information ciphertext with the security key to obtain the first information in plaintext form, so that the cloud platform can determine whether there is reference feature information that matches the image feature information in the cloud feature library according to the image feature information in the first information.

In the application scenario of the present disclosure, the security enhancement module is provided by the Internet of Things cloud platform, so it belongs to a trusted device, while the edge device is an external device independent of the cloud platform, so it belongs to an untrusted device. In the embodiment of the present disclosure, a security enhancement module is added in the cloud edge collaboration system, sensitive information such as a local feature library can be stored in the security enhancement module, and the security enhancement module is used to compare and determine the information, and send the determination result to the edge device in plaintext form. When the comparison of the security enhancement module is unsuccessful (i.e. there is no reference feature information that matches the image feature information in the local database), the security enhancement module encrypts the first information and sends it to the cloud platform for further comparison by the cloud platform, which can avoid the potential safety hazard due to the untrustworthiness of the edge device and improve the security of information transmission.

In practical application, in order to further improve the security of data transmission, a software development kit SDK corresponding to the security enhancement module can be integrated in the edge device. In this case, information transmission is carried out between the security enhancement module and the edge device through a preset application program interface; also, the application program interface is provided by an SDK corresponding to the security enhancement module. It can be seen that in this embodiment, when transferring data between the edge device and the security enhancement module, it is needed to invoke the application program interface API function provided by the SDK so as to be achieved. For example, when the edge device sends data to the security enhancement module, it needs to invoke the sending class application program interface matching the data type being sent; when the edge device receives the data returned by the security enhancement module, it needs to invoke the receiving class application program interface that matches the received data type. Since the parameters and execution logic of each application program interface function contained in the SDK are predefined, the execution logic related to accessing sensitive data can be avoided from being written into the interface function in the process of setting the SDK, thereby avoiding the issue that sensitive data is maliciously accessed.

Figure 3:
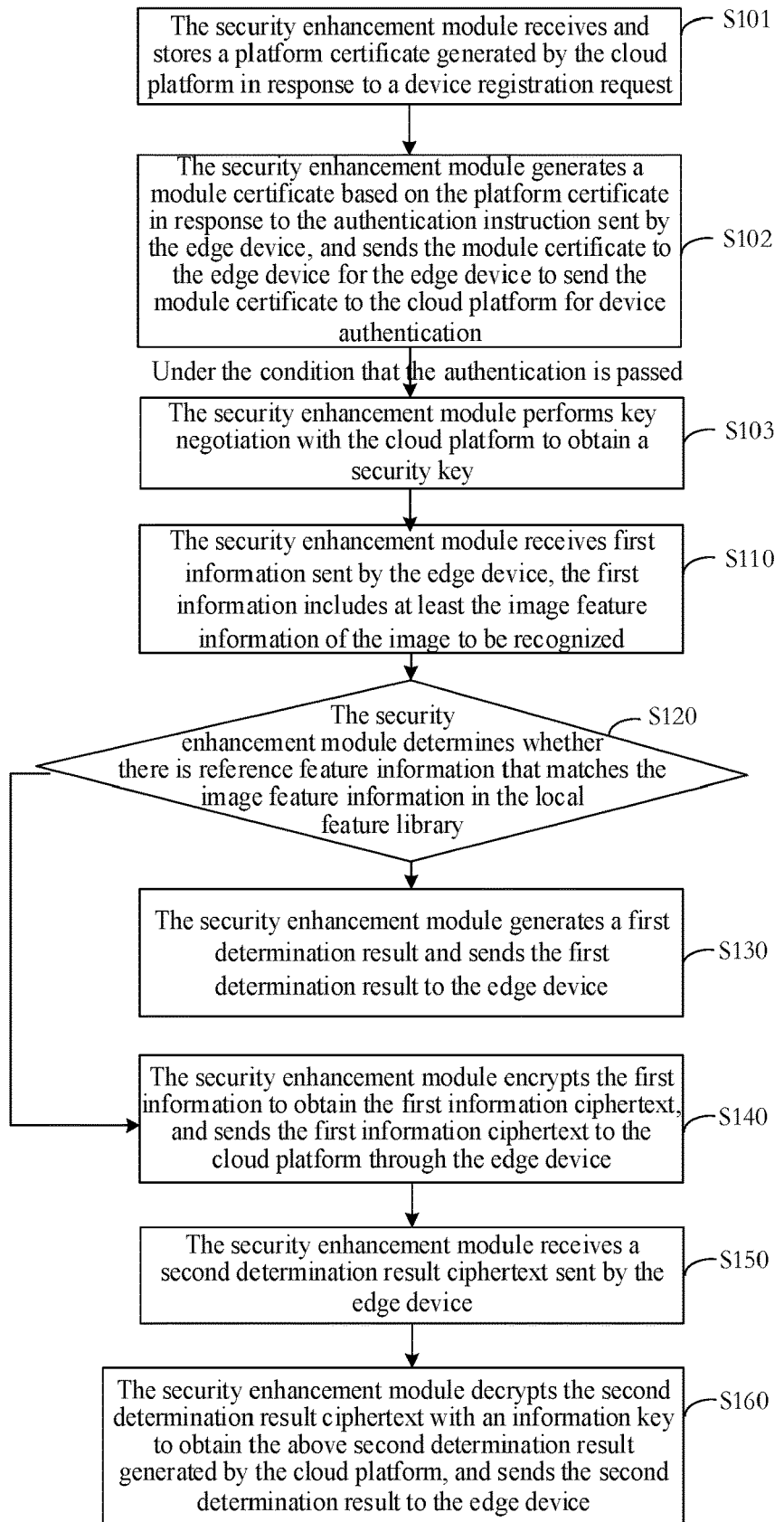
FIG. 3 is a schematic diagram of a cloud edge collaboration method provided in other embodiments of the present disclosure.

FIG. 3 is a schematic diagram of a cloud edge collaboration method according to other embodiments of the present disclosure, the cloud edge collaboration method is applied to the security enhancement module, as shown in FIG. 3, the method includes following operations.

In S101, the security enhancement module receives and stores a platform certificate generated by the cloud platform in response to a device registration request.

Among them, the device registration request is sent by the edge device to the cloud platform, and the device registration request is used to register the relevant information of the edge device in the cloud platform. The device registration request includes the module information of the security enhancement module and the device information of the edge device. After receiving the device registration request, the cloud platform generates a platform certificate according to the module information of the security enhancement module and the device information of the edge device. In addition, the cloud platform can encrypt the platform certificate to obtain a platform certificate in ciphertext form.

In addition, the platform certificate received by the security enhancement module can be directly sent to the security enhancement module by the cloud platform, or can be sent to the security enhancement module by the cloud platform through the edge device.

In S102, the security enhancement module generates a module certificate based on the platform certificate in response to the authentication instruction sent by the edge device, and sends the module certificate to the edge device, so that the edge device sends the module certificate to the cloud platform for device authentication.

Among them, the security enhancement module can add auxiliary verification data to the stored platform certificate to obtain the module certificate. Among them, the auxiliary verification data includes various additional data that can achieve the auxiliary verification function, such as time stamp data, device fingerprint data, etc.

As mentioned above, the platform certificate generated by the cloud platform is a platform certificate in ciphertext form. In this case, firstly, the security enhancement module decrypts the platform certificate in ciphertext form according to the platform certificate key (such as key A) provided by the cloud platform, and obtains the platform certificate in plaintext form. When the platform certificate is obtained by symmetric encryption, the platform certificate key used for decryption is the same as the platform certificate key used by the cloud platform for encryption, so that the decryption can be achieved at a faster speed. Of course, in other application scenarios with higher security, it can be achieved by asymmetric encryption and decryption.

Then, auxiliary verification data is added to the platform certificate in plaintext form to obtain the module certificate in plaintext form. For example, the security enhancement module obtains the internal system time, generates time-stamp data according to the internal system time, and adds the timestamp data to the platform certificate to obtain the module certificate. This process is essentially equivalent to a certificate recombination process, whereby security can be further enhanced with the help of auxiliary validation data. For example, if the timestamp data is tampered with, it indicates that the certificate has been attacked during the transmission process.

Finally, the module certificate in plaintext form is encrypted with the module certificate key to obtain the module certificate in ciphertext form. In an alternative implementation mode, the platform certificate in ciphertext form is obtained by symmetric encryption; the module certificate in ciphertext form is obtained by asymmetric encryption; moreover, the module certificate key is obtained from the cloud platform. Because the module certificate in ciphertext form is acquired by asymmetric encryption, the transmission security of the module certificate can be improved.

Among them, the module certificate key can be acquired in many ways. For example, in one implementation mode, the security enhancement module sends a communication request (also called a module certificate key acquisition request) to the cloud platform through the edge device. According to the received communication request, the cloud platform produces a module certificate private key b and a module certificate public key B, wherein, the module certificate private key b is stored in the cloud platform, and the module certificate public key B is forwarded to the security enhancement module through the edge device. The module certificate public key B is the module certificate key. It can be seen that asymmetric encryption and decryption are achieved by means of the module certificate private key b and the module certificate public key B.

When the device authentication passes, act S103 is executed: the security enhancement module performs key negotiation with the cloud platform to obtain a security key.

After the device authentication, the cloud platform sends the authentication result (which can be information in plaintext form) to the edge device, and the edge device sends the authentication result to the security enhancement module. When the authentication result received by the security enhancement module is that the authentication is passed, the security enhancement module performs key negotiation with the cloud platform.

Specifically, the key negotiation between the security enhancement module and the cloud platform specifically includes S103a and S103b:

In S103a, the security enhancement module receives a security key ciphertext sent by the edge device, wherein, the security key ciphertext is generated after the cloud platform encrypts a preset security key with its private key, and is sent to the edge device. Among them, the security key ciphertext is transmitted to the edge device via MQTT/MQTTS protocol, and the edge device performs a protocol conversion, and transmits the security key ciphertext to the security enhancement module via the USB protocol.

In S103b, the security enhancement module decrypts the security key ciphertext using the public key of the cloud platform to obtain the security key.

Among them, the security enhancement module can obtain the public key of the cloud platform in advance. Both the public key and the private key are generated by the cloud platform, and the cloud platform provides the public key to the security enhancement module in advance, wherein, the generation of the platform public key and the platform private key can be flexibly set, for example, the public key of the cloud platform can be the same as the module certificate public key B mentioned above, and the private key of the cloud platform can be the same as the module certificate private key b mentioned above.

After obtaining the security key, the security enhancement module executes the following acts S110 to 150.

In S110, the security enhancement module receives first information sent by the edge device, wherein, the first information includes the image feature information of the image to be recognized, and the image feature information includes the image feature information obtained by feature extraction of a face image collected by any of the image collection apparatuses. In addition, the first information also includes the serial number of the image collection apparatus that has collected the face image.

In S120, whether there is reference feature information that matches the image to be recognized in the local feature library is determined; if so, act S130 is executed; otherwise, act S140 is executed.

In some embodiments, act S120 may specifically include acts S121 and S122.

In S121, the similarity between the image feature information and each reference feature information in the local feature library is determined. The similarity can be determined by a conventional image similarity calculation method, which will not be described in detail here.

In S122, whether the maximum value of all the similarities obtained in act S121 is greater than or equal to a first preset threshold is determined; if so, it is determined that there is reference feature information that matches the image feature information in the local feature library; if not, it is determined that there is no reference feature information that matches the image feature information in the local feature library.

Herein, the above first preset threshold can be set according to actual needs, for example, 90%.

In S130, the security enhancement module generates a first determination result and sends the first determination result to the edge device.

In some embodiments, the image feature information includes: image feature information obtained by feature extraction of a face image collected by any of the image collection apparatuses; the first information also includes the serial number of the image collection apparatus that has collected the face image. Alternatively, when the security enhancement module determines that there is reference feature information that matches the image to be recognized in the local feature library, act S131 can be carried out: the security enhancement module encrypts the first determination result and the serial number of the image collection apparatus corresponding to the image to be analyzed to obtain a second information ciphertext, and sends the second information ciphertext to the cloud platform through the edge device.

The security enhancement module can encrypt the first determination result and the serial number of the image collection apparatus corresponding to the image to be analyzed with the above security key. After receiving the second information ciphertext, the cloud platform can decrypt the second information ciphertext with the above security key to obtain the second information, that is, obtain the first determination result and the serial number of the image collection apparatus corresponding to the image to be analyzed, and then display the first determination result and the serial number of the image collection apparatus corresponding to the image to be analyzed.

In S140, the security enhancement module encrypts the first information to obtain the first information ciphertext, and sends the first information ciphertext to the cloud platform through the edge device for the cloud platform to determine whether there is reference feature information that matches the image feature information in the cloud feature library based on the first information ciphertext.

Among them, in one example, the security enhancement module and the edge device can transmit data via the USB protocol, and the edge module can transmit data via the MQTTS protocol. When the security enhancement module sends the first information ciphertext to the edge device via the USB protocol, the edge device performs a protocol conversion on the received first information ciphertext and sends the protocol-converted first information ciphertext to the cloud platform. After receiving the first information ciphertext, the cloud platform can decrypt the first information ciphertext with the above security key to obtain the first information. After that, the cloud platform determines whether there is reference feature information that matches the image feature information in the first information in the cloud feature library.

In S150, the security enhancement module receives a second determination result ciphertext sent by the edge device.

Herein, the second determination result ciphertext is sent to the edge device by the cloud platform. Specifically, as described above, after receiving the first information ciphertext, the cloud platform can determine whether there is reference feature information that matches the image feature information in the cloud feature library based on the first information ciphertext, so as to generate the second determination result, and the second determination result ciphertext is generated by the cloud platform after encrypting the second determination result with the security key.

In S160, the security enhancement module decrypts the second determination result ciphertext with an information key to obtain the above second determination result generated by the cloud platform, and sends the second determination result to the edge device for subsequent operation by the edge device.

Figure 4:
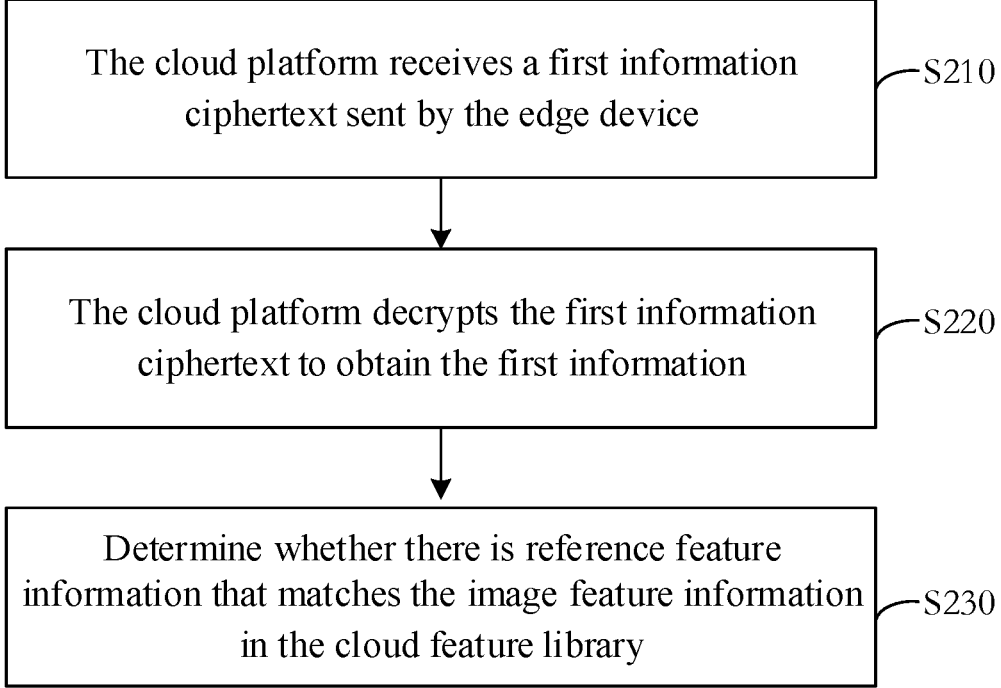
FIG. 4 is a schematic diagram of a cloud edge collaboration method provided in other embodiments of the present disclosure.

FIG. 4 is a schematic diagram of a cloud edge collaboration method provided in other embodiments of the present disclosure, and the cloud edge collaboration method shown in FIG. 4 may be applied to a cloud platform. As shown in FIG. 4, the cloud edge collaboration method includes following acts.

In S210, the cloud platform receives a first information ciphertext sent by the edge device. Herein, the first information ciphertext is generated and sent to the edge device by the security enhancement module after encrypting the first information when the security enhancement module determines that there is no reference feature information that matches the image feature information in the local feature library, and the first information at least includes the image feature information.

In S220, the cloud platform decrypts the first information ciphertext to obtain the first information.

The cloud platform can decrypt the first information ciphertext with a key negotiated with the security enhancement module in advance. In some examples, the key at the time of decryption in act S220 may be the same as the key at the time of encrypting the first message by the security enhancement module, thereby improving the encryption and decryption efficiency. Of course, in other embodiments, the key at the time of decryption in act S220 may be different from the key at the time of encryption of the first message by the security enhancement module, thereby improving the security of data transmission. For example, the security enhancement module encrypts the first information with the public key of the cloud platform obtained in advance, and in act S220, the cloud platform decrypts the first information ciphertext with the private key.

In S230, whether there is reference feature information that matches the image feature information in the cloud feature library is determined.

In the embodiment of the present disclosure, by adding a security enhancement module in the cloud edge collaboration system, sensitive information such as a local feature library can be stored in the security enhancement module, and the security enhancement module is used for comparing and judging the information, and sending the determination result to the edge device in plaintext form. When the comparison of the security enhancement module is unsuccessful (i.e. there is no reference feature information that matches the image feature information in the local database), the security enhancement module encrypts the first information and sends it to the cloud platform for further comparison by the cloud platform, which can avoid the potential safety hazard due to the untrustworthiness of the edge device and improve the security of information transmission.

FIG. 5 is a schematic diagram of a cloud edge collaboration method provided in other embodiments of the present disclosure, and the cloud edge collaboration method shown in FIG. 5 may be applied to a cloud platform. As shown in FIG. 5, the cloud edge collaboration method includes following acts.

In S201, a platform certificate is generated in response to a device registration request sent by the edge device, and the platform certificate is provided to the security enhancement module.

The device registration request is used for registering the relevant information of the edge device in the cloud platform, and in the device registration process, the cloud platform not only needs to record the device information of the edge device, but also needs to record the module information of the security enhancement module which establishes an association relationship with the edge device. Accordingly, in the subsequent device authentication process, the validity of the edge device and the security enhancement module is verified to ensure the trusted access of devices.

In a first application scenario, the security enhancement module is assigned to the edge device in advance, and correspondingly, the device registration request sent by the edge device includes module information of the security enhancement module and device information of the edge device. The module information of the security enhancement module is used to uniquely identify a security enhancement module, for example, it may be an ID identification of the security enhancement module. The device information of the edge device is used to describe the device characteristics of the edge device, for example, the device information includes a device business type and/or a device authentication type. Among them, the device business type is used to describe the business types of the edge device, such as conference type, security type, etc. In addition, the device business type can be gateway type, lighting type, camera type, etc. The device authentication type is used to describe the authentication method of the device, which can be set by the safety level of the device. In this approach, the edge device sends the device registration request, so that the correspondence between the edge device and the security enhancement module can be flexibly adjusted, which is convenient for achieving the flexible pairing between security enhancement module and the edge device and has high flexibility.

In the second application scenario, the security enhancement module is not assigned to the edge device in advance. Accordingly, after the cloud platform receives the device registration request, the cloud platform assigns a corresponding security enhancement module to the edge device. At this time, the device registration request sent by the edge device includes the device information of the edge device, but does not include the module information of the security enhancement module. In this approach, the security enhancement module is directly assigned by the cloud platform, so the correspondence between the security enhancement module and the edge device is preset by the cloud platform, and cannot be changed at will in the later stage, so the security is high.

In practice, at least one of the above two approaches can be arbitrarily selected according to the characteristics of specific business scenarios.

After receiving the device registration request, the cloud platform obtains the module information of the security enhancement module and the device information of the edge device contained in the device registration request, and generates the platform certificate according to the module information of the security enhancement module and the device information of the edge device. Alternatively, when the platform certificate is generated according to the module information of the security enhancement module and the device information of the edge device, the module information of the security enhancement module and the device information of the edge device are further encrypted to obtain the platform certificate in ciphertext form.

In the above first application scenario, the cloud platform parses the device registration request, obtains the module information of the security enhancement module and the device information of the edge device contained therein, executes encryption operation on the module information of the security enhancement module and the device information of the edge device through the platform certificate key (such as key A), and obtains the platform certificate according to the encryption result. In order to improve the execution efficiency of encryption, the encryption operation can be a symmetric encryption operation. For example, AES encryption algorithm can be used. It can be seen that the plaintext of the platform certificate includes the module information of the security enhancement module and the device information of the edge device, and the security in the transmission process can be improved through encryption operation.

In the second application scenario mentioned above, the cloud platform parses the device registration request, obtains the device information of the edge device contained therein, and assigns the corresponding security enhancement module according to the type of the edge device. Through the platform certificate key (such as key A), the module information of the assigned security enhancement module and the device information of the edge device are encrypted, and the platform certificate is obtained according to the encryption result. In this approach, the security enhancement module is assigned by the cloud platform according to the device information in the device registration request.

When the cloud platform provides the platform certificate to the security enhancement module, it can provide the platform certificate to the security enhancement module through the edge device or directly provide the platform certificate to the security enhancement module. Accordingly, the security enhancement module receives and stores the platform certificate generated by the cloud platform in response to the device registration request. For example, in the first application scenario mentioned above, the cloud platform sends the platform certificate to the edge device, and the edge device provides the platform certificate and the platform certificate key to the security enhancement module. In the second application scenario mentioned above, the cloud platform directly provides the platform certificate and the platform certificate key to the security enhancement module. Among them, in the former approach, the platform certificates stored in the security enhancement module are dynamically added, so that different edge devices can be dynamically adapted and flexibility is improved. In the latter approach, the platform certificate and the platform certificate key can be directly burned in the security enhancement module, thus further improving security.

In addition, no matter what approach is adopted, the cloud platform needs to record the correspondence between the module information of the security enhancement module and the device information of the edge device, so as to further improve the security in the subsequent authentication process with the help of the correspondence, and to prevent potential safety hazards due to the malicious replacement of the edge device or the security enhancement module.

In S202, the cloud platform receives the module certificate sent by the security enhancement module through the edge device.

The module certificate is generated based on the platform certificate by the security enhancement module after receiving the authentication instruction sent by the edge device. Refer specifically to the above description of act S102.

In S203, the cloud platform parses the module certificate and performs device authentication according to the parsing result.

Alternatively, when the module certificate is in ciphertext form, the cloud platform decrypts the received module certificate in ciphertext form to obtain the module certificate in plaintext form; matches the module certificate in plaintext form with the platform certificate generated in advance; if the match is successful, the device authentication is passed. Among them, the module certificate in ciphertext form can be asymmetrically decrypted with the module certificate private key b mentioned above.

Among them, the module certificate in plaintext form includes the auxiliary verification data and the platform certificate in plaintext form obtained by parsing by the security enhancement module. Under normal circumstances, the module information of the security enhancement module and the device information of the edge device contained in the platform certificate in plaintext form obtained by parsing by the security enhancement module are consistent with the relevant information in the platform certificate pre-generated by the cloud platform. Therefore, if the module certificate in plaintext form is successfully matched with the platform certificate generated in advance, the device authentication is passed; if the match is unsuccessful, the device authentication fails.

In one example, the cloud platform extracts effective information from the plaintext of the decrypted module certificate, for example, extracts the ID identification of the security enhancement module, that is, takes the unique ID inside the security enhancement module as the unique trusted root of the edge device in the cloud platform. Accordingly, in the comparison process, the cloud platform compares the extracted unique ID inside the security enhancement module with the trusted root stored by the cloud platform. If the comparison is successful, the authentication is successful, otherwise the authentication fails. The cloud platform transmits the authentication result in plaintext form to the edge device via the MQTT protocol, and the edge device transmits the authentication result to the security enhancement module via the USB protocol. In this example, the cloud platform only compares the module information of the security enhancement module, and the authentication is successful as long as the module information of the security enhancement module matches successfully.

In order to improve security, in other examples, the cloud platform compares not only the module information of the security enhancement module, but also the device information of the edge device. The authentication is successful only when the combined relationship of the module information of the security enhancement module and the device information of the edge device is consistent with the content stored in advance by the cloud platform. This approach performs authentication through the combined relationship of the module information of the security enhancement module and the device information of the edge device, and any change in any device of the edge device or the security enhancement module will result in authentication failure, thus improving security.

In S204, the cloud platform sends the authentication result to the edge device, so that the edge device sends a key negotiation request to the cloud platform when the authentication is passed.

In S205, in response to the key negotiation request sent by the edge device, the cloud platform encrypts a preset security key with the private key to generate a security key ciphertext.

Among them, the cloud platform can obtain the device information corresponding to the key negotiation request and generate the security key according to the device information. Herein, the device information includes the device business type and/or device authentication type mentioned above.

In one implementation mode, when the device authentication type is a first authentication type (such as a type of one-machine-one-key), the security key corresponds to the device identification. This type requires a key to be generated separately for each device, which is more secure due to the uniqueness of the device.

When the device authentication type is a second authentication type (such as a type of one-type-one-key), the security key corresponds to the type of the device. This type requires a key to be generated separately for each device type, and the security is slightly less secure than the security key of the first authentication type because a same type may contain multiple devices.

When the device authentication type is a third authentication type (such as a type of unified key), the security key corresponds to the device business type. In this type an unified security key is generated for all devices, so the security is the lowest. For example, a same security key can be generated for edge devices of the same business type.

Among them, the device authentication type and the generation approach of the security key specifically depend on factors such as the data type in the business scenario, which is not limited in this disclosure.

In addition, the cloud platform will use the private key to encrypt the security key to obtain the security key ciphertext, which can improve the security of data transmission.

In S206, the cloud platform sends the security key ciphertext to the security enhancement module through the edge device for the security enhancement module to decrypt the security key ciphertext.

Among them, the cloud platform transmits the security key ciphertext to the edge device via the MQTT protocol, and the edge device transmits the security key ciphertext to the security enhancement module via the USB protocol. After receiving the security key ciphertext, the security enhancement module decrypts the security key ciphertext with the public key of the cloud platform.

After S205 and S206, the cloud platform completes the key negotiation with the security enhancement module, and then executes the following acts S210 to 260.

In S210, the cloud platform receives the first information ciphertext sent by the edge device. Herein, the security enhancement module generates the first information ciphertext after encrypting the first information and sends it to the edge device under the condition that the security enhancement module determines that there is no reference feature information that matches the image feature information in the local feature library, and the first information at least includes the image feature information.

In S220, the cloud platform decrypts the first information ciphertext to obtain the first information.

In some embodiments, the first information ciphertext is obtained after the security enhancement module encrypts the first information with the security key described above, and accordingly, the cloud platform can decrypt the first information ciphertext with the security key.

In S230, the cloud platform determines whether there is reference feature information that matches the image feature information in the cloud feature library.

In some embodiments, act S230 may specifically include acts S231 and S232.

In S231, the similarity between the image feature information and each reference feature information in the cloud feature library is determined.

In S232, whether a maximum value of all the similarities obtained in act S232 is greater than or equal to a second preset threshold is determined; if so, it is determined that there is reference feature information that matches the image feature information in the cloud feature library; if not, it is determined that there is no reference feature information that matches the image feature information in the cloud feature library.

In one embodiment, the second preset threshold in act S232 may be equal to the first preset threshold in act S122 above.

In S240, the cloud platform encrypts the determination result in act S230 to generate a second determination result ciphertext.

Among them, the cloud platform can encrypt the determination result with the security key negotiated with the security enhancement module above.

In S250, the cloud platform sends the second determination result ciphertext to the security enhancement module through the edge device for the security enhancement module to decrypt the second determination result ciphertext and send the second determination result obtained after decryption to the edge device.

Herein, the cloud platform can send the second determination result ciphertext to the edge device via the MQTTS protocol, and the edge device performs a protocol conversion and then sends the second determination result ciphertext to the security enhancement module via the USB protocol, so that the security enhancement module can decrypt the second determination result with the security key as described above.

In some embodiments, the cloud edge collaboration method further includes: the cloud platform receives the security enhancement module status information sent by the edge device, and the security enhancement module status information is used to represent whether the security enhancement module is online; wherein, when the security enhancement module status information is offline information, the cloud platform responds to the authentication instruction instead of responding to the key negotiation request and the first message ciphertext. In other words, the above acts S205, S206, S210 to S250 are all performed when the security enhancement module status information is online information.

Figure 6:
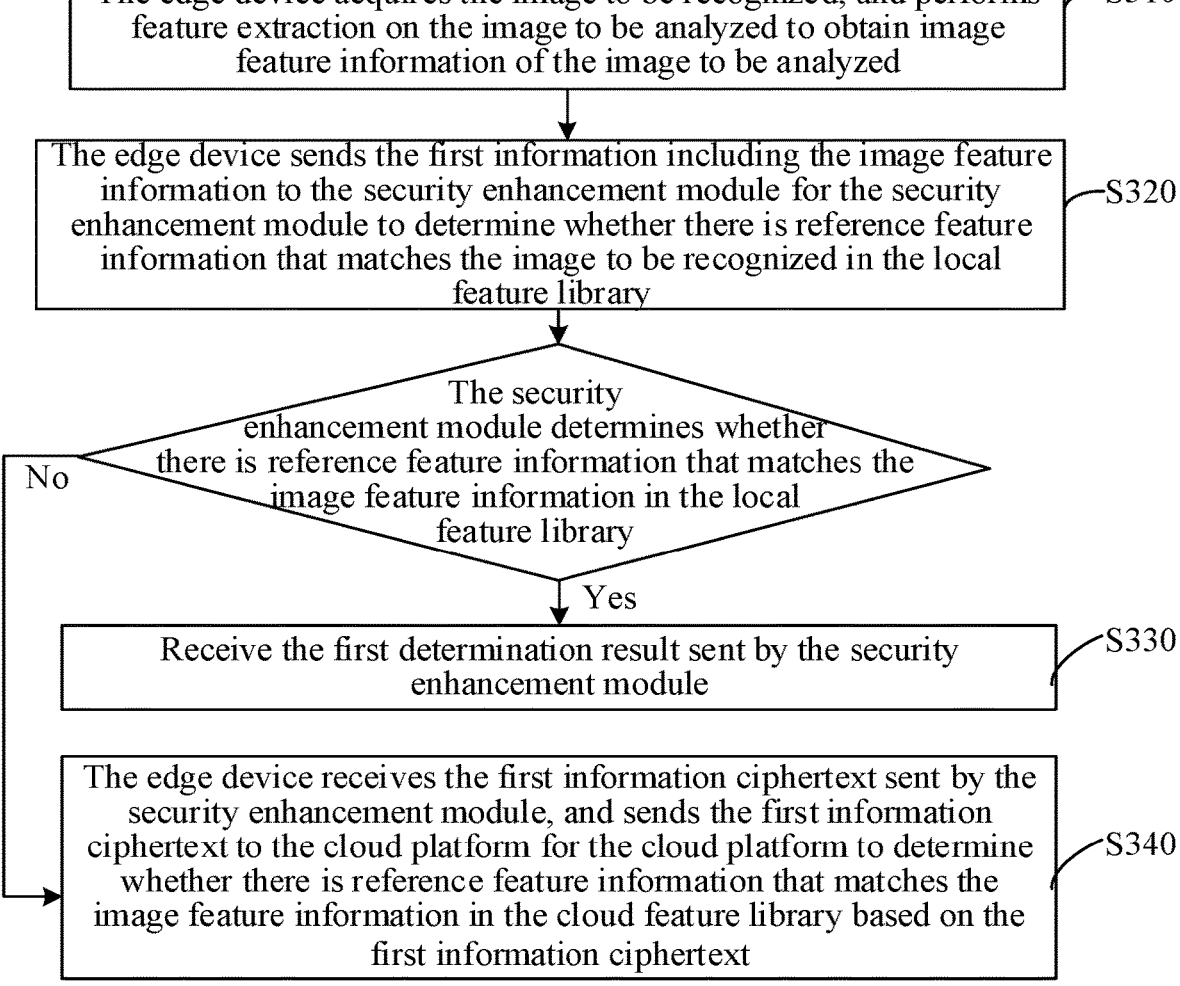
FIG. 6 is a schematic diagram of a cloud edge collaboration method provided in other embodiments of the present disclosure.

FIG. 6 is a schematic diagram of a cloud edge collaboration method provided in other embodiments of the present disclosure, the cloud edge collaboration method shown in FIG. 6 may be applied to an edge device, as shown in FIG. 6, the cloud edge collaboration method includes following acts.

In S310, the edge device acquires the image to be recognized, and performs feature extraction on the image to be analyzed to obtain image feature information of the image to be analyzed.

Herein, the image to be recognized can be acquired by an image collection apparatus and sent to the edge device. Wired or wireless connection can be adopted between the image collection apparatus and the edge device.

In S320, the edge device sends the first information including the image feature information to the security enhancement module for the security enhancement module to determine whether there is reference feature information that matches the image to be recognized in the local feature library.

Herein, the edge device can send the first information to the security enhancement module via the USB protocol.

The edge device executes act S330 when the security enhancement module determines that there is reference feature information that matches the image to be recognized in the local feature library, and the edge device executes act S340 when the security enhancement module determines that there is no reference feature information that matches the image to be recognized in the local feature library.

In S330, the first determination result sent by the security enhancement module is received.

In one example, the edge device is used for controlling the gate of at least one access control channel in a place such as a bank branch to be opened and closed. In this case, the edge device can control the corresponding gate to be opened after receiving the first determination result. For example, the edge device is connected with an image collection apparatus and a gate. At this time, the edge device controls the gate to open after receiving the first determination result. For another example, the edge device is connected with a plurality of image collection apparatuses and a plurality of gates, and the image collection apparatuses are arranged in one-to-one correspondence at the channel where the gates are located. In this case, the first information also includes the serial number of the image collection apparatus that collects the image to be recognized. When the edge device receives the first determination result, it controls the gate corresponding to the image collection apparatus to be opened.

In S340, the edge device receives the first information ciphertext sent by the security enhancement module, and sends the first information ciphertext to the cloud platform for the cloud platform to determine whether there is reference feature information that matches the image feature information in the cloud feature library based on the first information ciphertext.

Among them, the edge device communicates with the security enhancement module via the USB protocol and communicates with the cloud platform via the MQTTS protocol. The security enhancement module sends the first information ciphertext to the security enhancement module via the USB protocol, and the edge device performs a protocol conversion and then sends the first information ciphertext to the cloud platform via the MQTTS protocol.

FIG. 7 is a schematic diagram of a cloud edge collaboration method provided in other embodiments of the present disclosure, and the cloud edge collaboration method is applied to an edge device. As shown in FIG. 7, the cloud edge collaboration method includes the above S310 to S340. In addition, the following acts S301 to S306 before act S310 are also included.

In S301, the edge device sends a device registration request to the cloud platform, so that the security enhancement module receives and stores the platform certificate generated by the cloud platform in response to the device registration request.

Among them, the device registration request is used to register the relevant information of the edge device in the cloud platform. For details, please refer to the description of the device registration request in act S201 above, which will not be repeated here.

In S302, the edge device sends an authentication instruction to the security enhancement module for the security enhancement module to generate a module certificate based on the platform certificate.

Herein, the edge device initiates the device authentication operation actively, so as to send an authentication instruction to the security enhancement module.

In S303, the edge device sends the module certificate received from the security enhancement module to the cloud platform for the cloud platform to perform device authentication.

Among them, the process of generating module certificate by the security enhancement module and the process of device authentication by the cloud platform have been described above, which will not be repeated here.

In S304, the edge device sends a key negotiation request to the cloud platform.

In S305, the edge device receives the security key ciphertext sent by the cloud platform, wherein, the security key ciphertext is generated by the cloud platform in response to the key negotiation request and encrypting the security key with its private key.

In S306, the edge device sends the security key ciphertext to the security enhancement module for the security enhancement module to decrypt the security key ciphertext with the public key of the cloud platform to obtain the security key. Herein, the security key is the key used by the above security enhancement module when encrypting the first information and decrypting the second determination result ciphertext.

In some embodiments, act S340 is further followed by S350 to S370:

In S350, the edge device receives the second determination result ciphertext sent by the cloud platform, wherein, the second determination result ciphertext is generated by the cloud platform according to the determination result when the cloud platform determines whether there is reference feature information that matches the image feature information in the cloud feature library.

In S360, the edge device sends the second determination result ciphertext to the security enhancement module for the security enhancement module to decrypt the second determination result ciphertext to obtain the second determination result.

In S370, the edge device receives the second determination result sent by the security enhancement module, and the second determination result is data in plaintext form.

In some embodiments, the cloud edge collaboration method further includes: the edge device detects the status (online or offline) of the security enhancement module in real time, generates security enhancement module status information according to the status, and sends the security enhancement module status information to the cloud platform for the cloud platform to determine whether to respond to the key negotiation request and the first message ciphertext. Herein, when the security enhancement module status information is offline information, the cloud platform responds to the authentication instruction instead of responding to the key negotiation request and the first message ciphertext.

The following is an introduction to the interaction process among the cloud platform, the security enhancement module and the edge device in the cloud edge collaboration system in the context of a specific scenario.

In a scenario, the edge device is used to control gates of access control channels at bank branches, wherein each access control channel is provided with image collection apparatuses, and the edge device is connected with the image collection apparatuses and gates at each access control channel. The cloud edge collaboration method includes registration and authentication process, key negotiation process and image recognition process.

Figure 8:
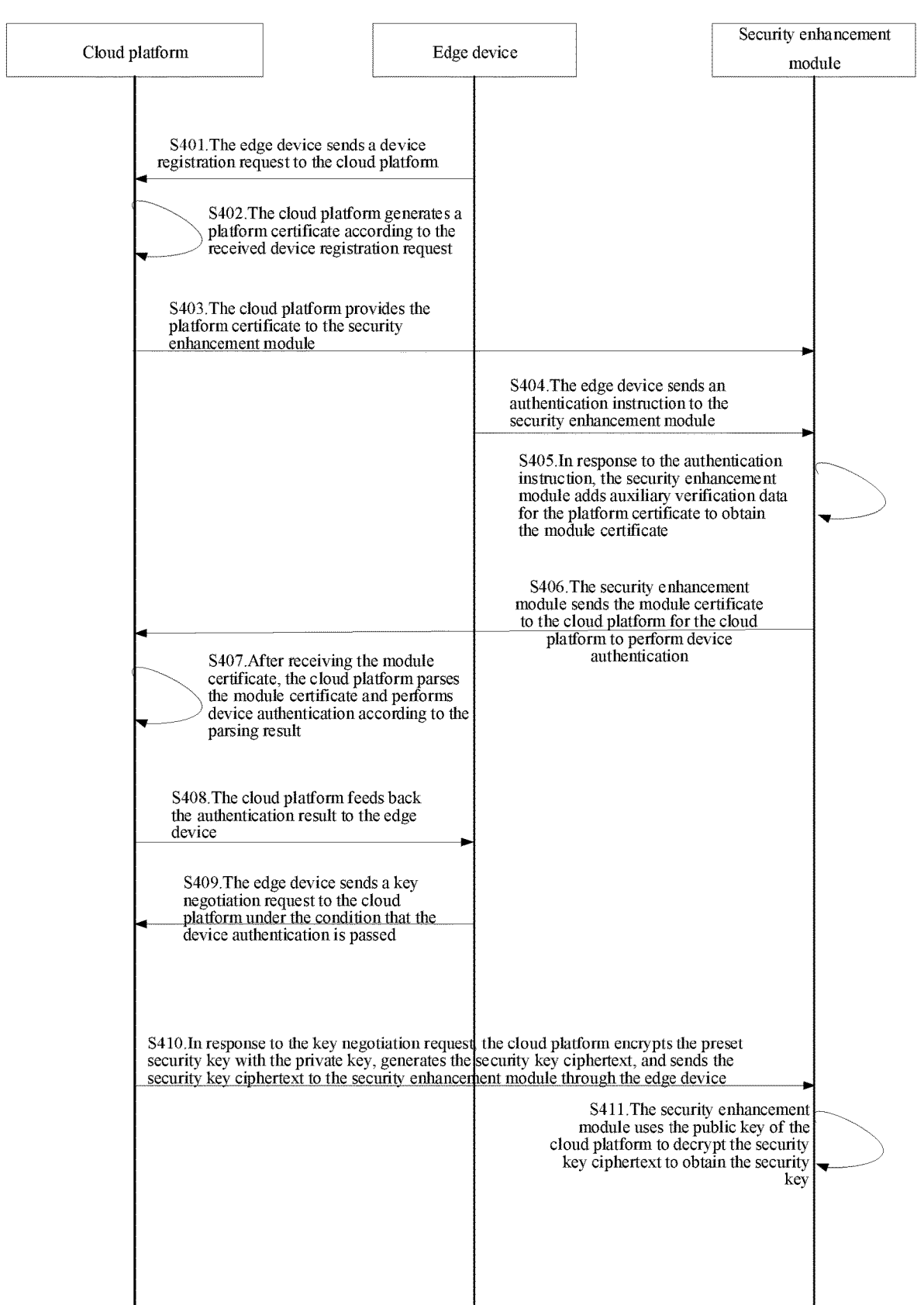
FIG. 8 is a schematic diagram of a registration and authentication process.

FIG. 8 is a schematic diagram of a registration and authentication process, which, as shown in FIG. 8, includes acts S401 to S408:

In S401, the edge device sends a device registration request to the cloud platform.

The device registration request is used to register the relevant information of the edge device on the cloud platform.

In S402, the cloud platform generates a platform certificate according to the received device registration request.

For the specific description of the device registration request and the process of generating the platform certificate by the cloud platform, please refer to the description in act S201 above, which will not be repeated here.

In S403, the cloud platform provides the platform certificate to the security enhancement module for the security enhancement module to store the cloud platform certificate.

The manner in which the platform certificate is provided to the security enhancement module is described in act S201 above, which will not be repeated here.

In S404, the edge device sends an authentication instruction to the security enhancement module.

In S405, in response to the authentication instruction, the security enhancement module adds auxiliary verification data to the platform certificate to obtain the module certificate.

The process of generating the module certificate by the security enhancement module is described in act S102 above, which will not be repeated here.

In S406, the security enhancement module sends the module certificate to the cloud platform for the cloud platform to perform device authentication.

Among them, the security enhancement module first sends the module certificate to the edge device, and the edge device sends the module certificate to the cloud platform for device authentication. Accordingly, the edge device sends the module certificate received from the security enhancement module to the cloud platform for the cloud platform to perform device authentication.

In one implementation mode, the security enhancement module sends the module certificate in ciphertext form to the edge device via the USB protocol, and the edge device sends the module certificate in ciphertext form to the cloud platform via the MQTT protocol.

In S407, after receiving the module certificate, the cloud platform parses the module certificate and performs device authentication according to the parsing result.

The process of device authentication by cloud platform is described in act S203 above, which will not be repeated here.

In S408, the cloud platform feeds back the authentication result to the edge device.

When the device authentication is passed, the key transmission process is carried out. The key negotiation process includes following acts S409 to S411.

In S409, the edge device sends a key negotiation request to the cloud platform.

In S410, in response to the key negotiation request, the cloud platform encrypts the preset security key with the private key, generates the security key ciphertext, and sends the security key ciphertext to the security enhancement module through the edge device. Refer specifically to the description of acts S205 and S206 above.

In S411, the security enhancement module uses the public key of the cloud platform to decrypt the security key ciphertext to obtain the security key. Refer specifically to the description in S103b above.

Among them, in the subsequent image recognition process, the security enhancement module and the cloud platform can encrypt and decrypt data with the security key.

FIG. 9 is a schematic diagram of an image recognition process, which, as shown in FIG. 9, includes acts S412 to 422.

In S412, the edge device receives the image to be recognized collected by the image collection apparatus, and performs feature extraction on the image to be recognized to obtain image feature information of the image to be recognized.

In S413, the edge device sends first information to the security enhancement module, and the first information includes: the image feature information and the serial number of the image collection apparatus corresponding to the image to be recognized.

In S414, the security enhancement module determines whether there is reference feature information that matches the image feature information in the local feature library, if so, acts S415 and S416 are executed, and otherwise, act S417 is executed.

In S415, the security enhancement module sends the first determination result to the edge device. After receiving the first determination result, the edge device can control the gate of the access control channel where the image collection apparatus is located to open.

In S416, the security enhancement module encrypts the first determination result and the serial number of the image collection apparatus corresponding to the image to be analyzed to obtain the second information ciphertext, and sends the second information ciphertext to the cloud platform through the edge device.

The security enhancement module can encrypt the first determination result and the serial number of the image collection apparatus corresponding to the image to be analyzed with the security key described above. After receiving the second information ciphertext, the cloud platform decrypts the second information ciphertext with the security key to obtain the first determination result and the serial number of the image collection apparatus, which can then be displayed.

In S417, the security enhancement module encrypts the first information to obtain the first information ciphertext, and sends the first information ciphertext to the cloud platform through the edge device.

The security enhancement module can encrypt the first information with the security key described above.

In S418, after receiving the first information ciphertext, the cloud platform decrypts the first information ciphertext to obtain a first message. After that, the cloud platform compares the image feature information in the first information with the reference feature information in the cloud feature library to determine whether there is reference feature data that matches the image feature information in the cloud feature library.

The cloud platform can decrypt the first information ciphertext with the security key. During feature comparison, the image feature information can be compared with a plurality of reference feature information in the cloud feature library one by one to obtain the similarity between the image feature information and each reference feature information. If there is a similarity greater than a second preset threshold, it indicates that there is reference feature data that matches the image feature information in the cloud feature library.

In S419, the cloud platform encrypts the determination result to generate the second determination result ciphertext.

The cloud database can encrypt the determination result with the security key described above.

In S420, the cloud platform sends the second determination result ciphertext to the security enhancement module through the edge device.

In S421, the security enhancement module decrypts the second determination result ciphertext to obtain the second determination result.

In S422, the security enhancement module sends the second determination result to the edge device for the edge device to perform corresponding action. For example, when the second determination result is that there is a reference feature image that matches the image feature information of the image to be recognized in the cloud feature library, the gate of the access control channel, where the image collection apparatus corresponding to the image to be recognized is located, is controlled to open.

It is understood that the reference feature information in the cloud feature library is much more than the reference feature information in the local feature library. The local feature library is a subset of the cloud feature library. For example, the security enhancement module connected with the edge device of the bank branch A stores the image feature information of the face images of the employees of the bank branch A, and the cloud feature library stores the image feature information of the face images of the employees of a plurality of bank branches. When the employees of the bank branch A enter the bank branch A, the image feature information is compared with the reference feature information in the local feature library without using the cloud feature library to perform feature comparison; when the employees of Bank branch B enter Bank branch A, because the reference feature information that matches the image feature information is not stored in the local feature library, it is needed to use the cloud feature library for further feature comparison.

It should be noted that in practical application, the above key negotiation process can be executed only once, thereby utilizing the negotiated security key to perform subsequent multiple image recognition processes. It is also possible to perform multiple key negotiation processes in multiple image recognition processes, for example, to perform a key negotiation process every preset time interval to change the security key and improve the security. Among them, the specific execution timing and frequency of key negotiation process can be flexibly set according to business scenarios, so as to fully meet the security requirements of various data transmission businesses.

Embodiments of the present disclosure incorporate a security enhancement module on the edge side to maximize the protection for the security of the edge device through the device authentication of the security enhancement module, the edge device and the cloud platform and the establishment of a data interaction approach. The security enhancement module interacts data with the edge device through an USB interface to be compatible with existing devices. In addition, the security data interaction mechanism among the security enhancement module, the edge device and the cloud platform is constructed through the security enhancement module and edge device security SDK.

Among them, the security enhancement module has at least the following characteristics. Sensitive data such as keys and certificates are stored in a trusted manner and cannot be sent to the outside through an USB interface. Moreover, sensitive data is stored in encrypted form within the security enhancement module, and the plaintext information of the encrypted data stored in the security enhancement module cannot be directly obtained even if the security enhancement module is cracked. For example, the security key stored inside the security enhancement module is stored in ciphertext form through a secondary encryption process.

In addition, sensitive data stored inside the security enhancement module is not externally transmitted. Sensitive data such as certificates can be written through custom upper-level software, and can only be written but not read out. Moreover, the encryption process and the decryption process are both completed in the security enhancement module, which avoids the defect of vulnerability to be attacked caused by encryption and decryption in external devices.

The security enhancement module can dynamically execute key negotiation operation with the cloud platform through the edge device, and the frequency of key negotiation can be flexibly adjusted to further improve security.

In the application scenario of the present disclosure, the security module is provided by the Internet of Things cloud platform, so it belongs to a trusted device, while the data transmission device is an external device independent of the cloud platform, so it belongs to an untrusted device. In order to avoid the security issue caused by attacks on untrusted devices, the local feature library is stored in the security module, and the feature comparison, encryption and decryption processes are implemented inside the security enhancement module.

Moreover, in order to further improve security, a software development kit SDK is provided for the security enhancement module. Correspondingly, the data transmission device can communicate with the security enhancement module and the cloud platform by simply integrating the SDK. That is, data transmission is carried out between the security enhancement module and the data transmission device through a preset application program interface; and, the application program interface is provided by a software development kit corresponding to the security enhancement module. It can be seen that in the present disclosure, when transferring data between the edge device and the security enhancement module, it is needed to utilize the application program interface API function provided by the SDK to achieve the transmission. For example, when the edge device sends data to the security enhancement module, it needs to invoke the sending class application program interface that matches the data type being sent to implement it; when the edge device receives the data returned by the security enhancement module, it needs to invoke the receiving class application program interface that matches the data type be received to implement it. Since the parameters and execution logic of each application program interface function contained in the SDK are predefined, the execution logic related to accessing sensitive data can be avoided from being written into the interface function during the process of setting up the SDK, thereby avoiding the issue that sensitive data is maliciously accessed.

Figures 10, 11:
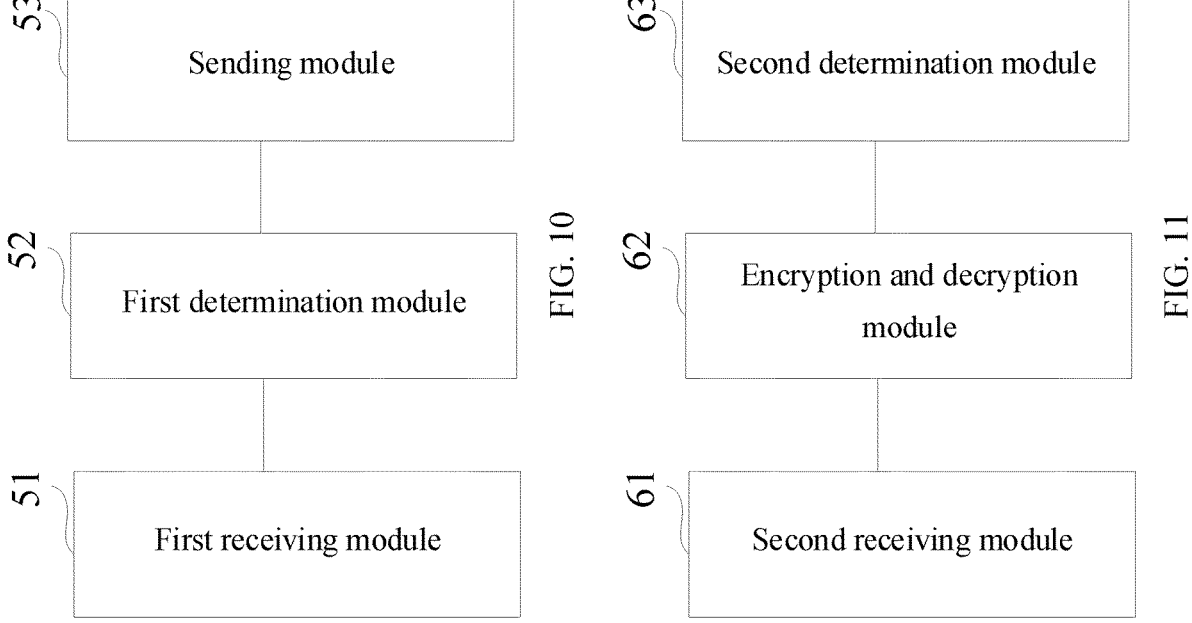
FIG. 10 is a schematic diagram of a data transmission apparatus provided in some embodiments of the present disclosure.
FIG. 11 is a schematic diagram of a cloud platform provided in some embodiments of the present disclosure.

FIG. 10 is a schematic diagram of a data transmission apparatus provided in some embodiments of the present disclosure and the apparatus may be a security enhancement module mentioned above. As shown in FIG. 10, the data transmission apparatus includes a first receiving module 51, a first determination module 52 and a sending module 53.

The first receiving module 51 is configured to receive first information sent by the edge device, and the first information includes at least image feature information of an image to be recognized.

The first determination module 52 is configured to determine whether there is reference feature information that matches the image feature information in the local feature library;

The sending module 53 is configured to generate a first determination result when there is reference feature information that matches the image feature information in the local feature library and send the first determination result to the edge device; and, encrypt the first information to obtain a first information ciphertext when there is no reference feature information that matches the image feature information in the local feature library, and send the first information ciphertext to the cloud platform through the edge device for the cloud platform to determine whether there is reference feature information that matches the image feature information in the cloud feature library based on the first information ciphertext.

In an alternative implementation, the first receiving module 51 is further configured to receive the second determination result ciphertext sent by the edge device, and the second determination result ciphertext is sent to the edge device by the cloud platform after the cloud platform encrypts a second determination result; the second determination result is a determination result of the cloud platform determining whether there is reference feature information that matches the image feature information in the cloud feature library.

The sending module 53 is further configured to decrypt the second determination result ciphertext, obtain the second determination result, and send the second determination result to the edge device.

In an optional implementation, the data transmission apparatus further includes a key acquisition module configured to perform key negotiation with the cloud platform to obtain a secure key. Alternatively, the key acquisition module is specifically configured to receive the security key ciphertext sent by the edge device, and decrypt the security key ciphertext with the public key of the cloud platform to obtain the security key. Herein, the security key ciphertext is generated and sent to the edge device by the cloud platform after the cloud platform encrypts the security key with its private key;

Herein, when the first information is encrypted, the first information is encrypted with the security key to obtain the first information ciphertext. When the second determination result ciphertext is decrypted, the second determination result ciphertext is decrypted with the security key to obtain the second determination result.

In some optional implementation, the data transmission apparatus further includes: a first authentication module configured to receive and store a platform certificate generated by the cloud platform in response to the device registration request; generate a module certificate based on the platform certificate in response to the authentication instruction sent by the edge device, and send the module certificate to the edge device for the edge device to send the module certificate to the cloud platform for device authentication.

The performing key negotiation with the cloud platform to obtain a security key specifically includes: performing key negotiation with the cloud platform to obtain the security key under the condition that the device authentication is passed.

In an optional implementation, the first determination module is specifically configured to determine a similarity between the image feature information and each reference feature information in the local feature library; determine whether the maximum value of all similarities is greater than or equal to a first preset threshold; if so, determine that there is reference feature information that matches the image feature information in the local feature library; if not, determine that there is no reference feature information matches the image feature information in the local feature library.

In an optional implementation, the edge device is connected with a plurality of image collection apparatuses, and the image feature information includes: image feature information obtained by feature extraction of a face image collected by any of the image collection apparatuses, and the first information further includes: the serial number of the image collection apparatus collecting the face image. The sending module is further configured to encrypt the first determination result and the serial number of the image collection apparatus corresponding to the image to be analyzed to obtain a second information ciphertext when there is reference feature information that matches the image feature information in the local feature library, and send the second information ciphertext to the cloud platform through the edge device.

FIG. 11 is a schematic diagram of a cloud platform provided in some embodiments of the present disclosure. As shown in FIG. 11, the cloud platform includes a second receiving module 61, an encryption and decryption module 62 and a second determination module 63.

The second receiving module 61 is configured to receive a first information ciphertext sent by the edge device. The first information ciphertext is generated and sent to the edge device by the security enhancement module after encrypting the first information when the security enhancement module determines that there is no reference feature information that matches the image feature information in the local feature library. The first information at least includes the image feature information.

The encryption and decryption module 62 is configured to decrypt the first information ciphertext to obtain the first information;

The second determination module 63 is configured to determine whether there is reference feature information that matches the image feature information in the cloud feature library.

In an optional implementation, the encryption and decryption module 62 is further configured to encrypt the determination result after the second determination module 63 determines whether there is reference feature information that matches the image feature information in the cloud feature library and generate a second determination result ciphertext; send the second determination result ciphertext to the security enhancement module through the edge device for the security enhancement module to decrypt the second determination result ciphertext, and send the second determination result obtained after being decrypted to the edge device.

In an optional implementation, the cloud platform further includes: a key negotiation module configured to encrypt a preset security key with a private key in response to a key negotiation request sent by the edge device to generate a security key ciphertext; send the security key ciphertext to the security enhancement module through the edge device for the security enhancement module to decrypt the security key ciphertext. Herein, the key used for decrypting the first information ciphertext is the security key.

In an optional implementation, the cloud platform further includes: a second authentication module configured to generate a platform certificate in response to a device registration request sent by the edge device, and provide the platform certificate to the security enhancement module; receive a module certificate sent by the security enhancement module through the edge device; parse the module certificate, and perform device authentication according to the parsing result.

In an optional implementation, the second receiving module is further configured to receive the security enhancement module status information sent by the edge device.

In an optional implementation, the second determination module is specifically configured to determine the similarity between the image feature information and each reference feature information in the cloud feature library; determine whether the maximum value of all similarities is greater than or equal to a second preset threshold; if so, determine that there is reference feature information that matches the image feature information in the cloud feature library; if not, determine that there is no reference feature information that matches the image feature information in the cloud feature library.

Figures 12, 13, 14:
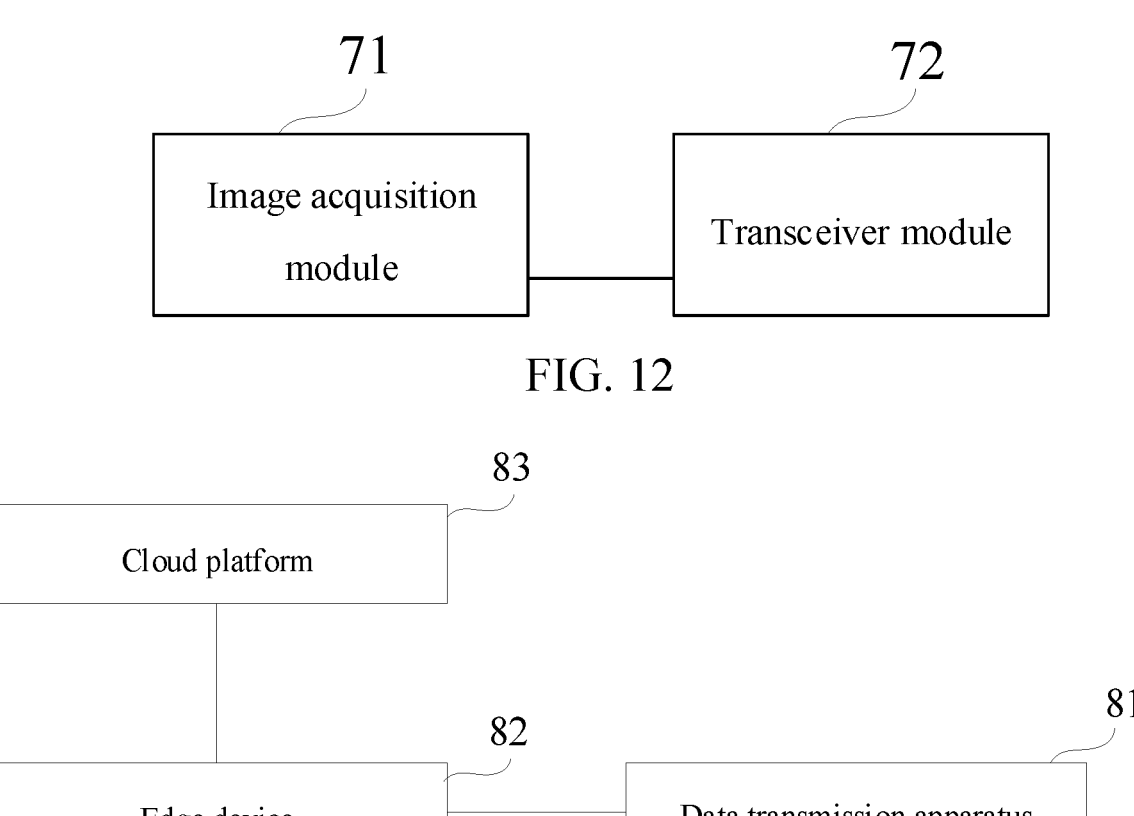
FIG. 12 is a schematic diagram of an edge device provided in some embodiments of the present disclosure.
FIG. 13 is a schematic diagram of a cloud edge collaboration system provided in some embodiments of the present disclosure.
FIG. 14 is a schematic diagram of an electronic device provided in some embodiments of the present disclosure.

FIG. 12 is a schematic diagram of an edge device according to some embodiments of the present disclosure. As shown in FIG. 12, the edge device includes an image acquisition module 71 and a transceiver module 72.

The image acquisition module 71 is configured to acquire an image to be recognized and perform feature extraction on the image to be analyzed to obtain image feature information of the image to be analyzed;

The transceiver module 72 is configured to send first information including the image feature information to the security enhancement module for the security enhancement module to determine whether there is reference feature information that matches the image to be recognized in the local feature library; and receive a first determination result sent by the security enhancement module when the security enhancement module determines that there is reference feature information that matches the image to be recognized in the local feature library; receive first information ciphertext sent by the security enhancement module when the security enhancement module determines that there is no reference feature information that matches the image to be recognized in the local feature library, and send the first information ciphertext to the cloud platform for the cloud platform to determine whether there is reference feature information that matches the image feature information in the cloud feature library based on the first information ciphertext.

In an optional implementation, the transceiver module 72 is further configured to receive a second determination result ciphertext sent by the cloud platform; wherein, the second determination result ciphertext is generated by the cloud platform according to the determination result when the cloud platform determines whether there is reference feature information that matches the image feature information in the cloud feature library; send the second determination result ciphertext to the security enhancement module; receive a second determination result sent by the security enhancement module; wherein, the second determination result is obtained by decrypting the second determination result ciphertext by the security enhancement module.

In an optional implementation, the transceiver module 72 is further configured to: send a key negotiation request to the cloud platform; receive a security key ciphertext sent by the cloud platform, wherein, the security key ciphertext is generated by the cloud platform after the cloud platform responds to the key negotiation request and encrypts the security key with its private key; send the security key ciphertext to the security enhancement module for the security enhancement module to decrypt the security key ciphertext with the public key of the cloud platform to obtain the security key, and the security key is used for encrypting the first information and decrypting the second determination result ciphertext.

In an optional implementation, the transceiver module 72 is further configured to send a device registration request to the cloud platform such that the security enhancement module receives and stores a platform certificate generated by the cloud platform in response to the device registration request; send an authentication instruction to the security enhancement module for the security enhancement module to generate a module certificate based on the platform certificate; send the received module certificate from the security enhancement module to the cloud platform for the cloud platform to perform device authentication.

In an optional implementation, the edge device further includes a detection module configured to detect the status of the security enhancement module in real time and send the security enhancement module status information to the cloud platform according to the status of the security enhancement module.

FIG. 13 is a schematic diagram of a cloud edge collaboration system provided in some embodiments of the present disclosure. As shown in FIG. 13, the cloud edge collaboration system includes a cloud platform 83, an edge device 82, and a data transmission apparatus 81, wherein, the structure of the cloud platform 83 is shown in FIG. 11, the structure of the edge device 82 is shown in FIG. 12, and the structure of the data transmission apparatus is shown in FIG. 10.

FIG. 14 is a schematic diagram of an electronic device provided in some embodiments of the present disclosure. As shown in FIG. 14, the electronic device includes:

One or more processors 901; A memory 902 having one or more programs stored thereon, which, when executed by the one or more processors, cause the one or more processors to implement the cloud edge collaboration method of any of the foregoing;

One or more I/O interfaces 903, coupled between the processor and the memory, configured to enable information interaction between the processor and the memory.

The processor 901 is a device with data processing capability, including but not limited to a central processing unit (CPU), etc.; the memory 902 is a device with data storage capability, including but not limited to a random access memory (RAM, more specifically SDRAM, DDR, etc.), a read only memory (ROM), an electrically erasable programmable read only memory (EEPROM), flash memory (FLASH); the I/O interface (read-write interface) 903 is connected between the processor 901 and the memory 902, and can achieve information interaction between the processor 901 and the memory 902, including but not limited to a data bus (Bus) and the like.

In some embodiments, the processor 901, the memory 902 and the I/O interface 903 are connected to each other via a bus and thereby connected to other components of the computing device.

The present embodiment further provides a computer readable medium having stored thereon computer programs, wherein when the computer programs are executed by a processor, the cloud edge collaboration method provided by the present embodiments is implemented, and in order to avoid repetition of the description, the specific acts of the cloud edge collaboration method will not be repeated herein.

It may be understood by those of ordinary skills in the art that all or some acts in the method and function modules/units in the system and the apparatus disclosed above may be implemented as software, firmware, hardware, and appropriate combinations thereof. In a hardware implementation, division of the function modules/units mentioned in the above description is not always corresponding to division of physical components. For example, a physical component may have multiple functions, or a function or an act may be executed by several physical components in cooperation. Some physical components or all physical components may be implemented as software executed by a processor such as a central processing unit, a digital signal processor or a microprocessor, or implemented as hardware, or implemented as an integrated circuit such as an application specific integrated circuit. Such software may be distributed in a computer-readable medium, and the computer-readable medium may include a computer storage medium (or a non-transitory medium) and a communication medium (or a transitory medium). As known to those of ordinary skill in the art, a term of computer storage medium includes volatile and nonvolatile, removable and irremovable media implemented in any method or technology for storing information (for example, computer-readable instructions, a data structure, a program module, or other data). The computer storage medium includes, but not limited to, RAM, ROM, EEPROM, a flash memory or another memory technology, CD-ROM, a digital versatile disk (DVD) or another optical disk storage, a magnetic cassette, a magnetic tape, a magnetic disk storage, or another magnetic storage apparatus, or any other medium that may be configured to store desired information and may be accessed by a computer. In addition, it is known to those of ordinary skill in the art that the communication medium usually includes computer-readable instructions, a data structure, a program module, or other data in a modulated data signal, such as, a carrier or other transmission mechanisms, and may include any information delivery medium.

It should be noted that, as used herein, the terms "include", "contain" or any other variations thereof are intended to cover a non-exclusive inclusion, such that a process, method, article, or apparatus that includes a series of elements includes not only those elements but also other elements which are not expressly listed, or further includes elements inherent to such a process, method, article, or apparatus. Without more limitations, an element defined by a statement "include one . . . " does not exclude presence of additional identical elements in the process, method, article or system that includes the element.

It is to be understood that the above implementation are only exemplary implementation adopted for illustrating principles of the present disclosure, however the present disclosure is not limited thereto. For those of ordinary skill in the art, various modifications and improvements may be made without departing from the spirit and substance of the present disclosure, and these modifications and improvements are also considered to be within the scope of the present disclosure.

The invention claimed is:

1. A cloud edge collaboration method, which is applied to a security enhancement module, wherein the security enhancement module is connected to an edge device directly, the security enhancement module is connected to a cloud platform indirectly and the security enhancement module is connected to the cloud platform through the edge device, wherein the method comprises:

receiving first information sent by the edge device, wherein the first information comprises at least image feature information of an image to be recognized;

determining whether there is reference feature information that matches the image feature information in a local feature library;

generating a first determination result and sending the first determination result to the edge device based on a determination that there is reference feature information that matches the image to be recognized in the local feature library; and based on a determination that there is no reference feature information that matches the image feature information in the local feature library, encrypting the first information to obtain a first information ciphertext, sending the first information ciphertext to the edge device, not sending the first information ciphertext to the cloud platform directly, and sending the first information ciphertext to the cloud platform through the edge device, for the cloud platform to determine, based on the first information ciphertext, whether there is reference feature information that matches the image feature information in a cloud feature library, wherein data transmission between the security enhancement module and the edge device is implemented through an application program interface (API), the application program interface is provided by a software development kit (SDK) corresponding to the security enhancement module;

wherein an execution logic related to accessing sensitive data are not written into an interface function of the application program interface during setting the SDK, wherein after sending the first information ciphertext to the cloud platform through the edge device, the method further comprises:

receiving a second determination result ciphertext sent by the edge device, not directly receiving the second determination result ciphertext from the cloud platform, the second determination result ciphertext is sent to the edge device by the cloud platform after the cloud platform encrypts a second determination result; the second determination result is a determination result of the cloud platform determining whether there is reference feature information that matches the image feature information in the cloud feature library; and decrypting the second determination result ciphertext to obtain the second determination result and sending the second determination result to the edge device.

2. The method according to claim 1, wherein before receiving the first information sent by the edge device, the method further comprises: performing key negotiation with the cloud platform to obtain a security key;

encrypting the first information to obtain the first information ciphertext, comprises: encrypting the first information using the security key to obtain the first information ciphertext; and decrypting the second determination result ciphertext to obtain the second determination result, comprises: decrypting the second determination result ciphertext with the security key to obtain the second determination result.

3. The method according to claim 2, wherein performing key negotiation with the cloud platform comprises:

receiving a security key ciphertext sent by the edge device, wherein the security key ciphertext is generated and sent to the edge device by the cloud platform after the cloud platform encrypts the security key with a private key of the cloud platform; and decrypting the security key ciphertext with a public key of the cloud platform to obtain the security key.

4. The method according to claim 2, wherein before performing key negotiation with the cloud platform, the method further comprises:

receiving and storing a platform certificate generated by the cloud platform in response to a device registration request; and generating a module certificate based on the platform certificate in response to an authentication instruction sent by the edge device, and sending the module certificate to the edge device for the edge device to send the module certificate to the cloud platform for device authentication, wherein performing key negotiation with the cloud platform to obtain the security key comprises: performing key negotiation with the cloud platform to obtain the security key under a condition that the device authentication is passed.

5. The method according to claim 1, wherein determining whether there is reference feature information that matches the image feature information in the local feature library comprises:

determining a similarity between the image feature information and each reference feature information in the local feature library; and determining whether a maximum value of all similarities is greater than or equal to a first preset threshold; if so, determining that there is reference feature information that matches the image feature information in the local feature library, and if not, determining that there is no reference feature information that matches the image feature information in the local feature library.

6. The method according to claim 1, wherein the edge device is connected with a plurality of image collection apparatuses, and the image feature information comprises: image feature information obtained by feature extraction of an image to be recognized collected by any of the image collection apparatuses, and the first information further comprises: a serial number of an image collection apparatus having collected the image to be recognized;

in a case that there is reference feature information that matches the image to be recognized in the local feature library, the method further comprises:

encrypting the first determination result and the serial number of the image collection apparatus corresponding to the image to be recognized to obtain a second information ciphertext, and sending the second information ciphertext to the cloud platform through the edge device.

7. A cloud edge collaboration method, applied to a cloud platform, wherein the cloud platform is connected to an edge device directly, the cloud platform is connected to a security enhancement module indirectly and the cloud platform is connected to the security enhancement module through the edge device, wherein the method comprises:

receiving a first information ciphertext sent by the edge device, not receiving the first information ciphertext directly from the security enhancement module, the first information ciphertext is generated and sent to the edge device by the security enhancement module after encrypting first information based on that the security enhancement module determines that there is no reference feature information that matches image feature information in a local feature library, and the first information at least comprises the image feature information;

decrypting the first information ciphertext to obtain the first information; and determining whether there is reference feature information that matches the image feature information in a cloud feature library, wherein data transmission between the security enhancement module and the edge device is implemented through an application program interface (API), the application program interface is provided by a software development kit (SDK) corresponding to the security enhancement module;

wherein an execution logic related to accessing sensitive data are not written into an interface function of the application program interface during setting the SDK, wherein after determining whether there is reference feature information that matches the image feature information in the cloud feature library, the method further comprises:

encrypting a determination result to generate a second determination result ciphertext; and sending the second determination result ciphertext to the edge device to allow the edge device to send the received security enhancement module to the security enhancement module for the security enhancement module to decrypt the second determination result ciphertext and send the second determination result obtained after being decrypted to the edge device.

8. The method according to claim 7, wherein before receiving the first information ciphertext sent by the edge device, the method further comprises:

in response to a key negotiation request sent by the edge device, encrypting a preset security key with a private key to generate a security key ciphertext; and sending the security key ciphertext to the security enhancement module through the edge device for the security enhancement module to decrypt the security key ciphertext, wherein a key used for decrypting the first information ciphertext is the security key.

9. The method according to claim 8, wherein before responding to the key negotiation request sent by the edge device, the method further comprises:

generating a platform certificate in response to a device registration request sent by the edge device, and providing the platform certificate to the security enhancement module;

receiving a module certificate sent by the security enhancement module through the edge device; and parsing the module certificate and performing device authentication according to a parsing result.

10. The method according to claim 7, wherein the method further comprises:

receiving module status information sent by the edge device, the module status information is used to represent whether the security enhancement module is online or not.

11. The method according to claim 7, wherein determining whether there is reference feature information that matches the image feature information in the cloud feature library comprising:

determining a similarity between the image feature information and each reference feature information in the cloud feature library; and determining whether a maximum value of all similarities is greater than or equal to a second preset threshold; if so, determining that there is reference feature information that matches the image feature information in the cloud feature library; if not, determining that there is no reference feature information that matches the image feature information in the cloud feature library.

12. A cloud edge collaboration method, applied to an edge device, wherein the edge device is connected to a security enhancement module directly, the edge device is connected to a cloud platform directly, the security enhancement module is connected to the cloud platform indirectly and the security enhancement module is connected to the cloud platform through the edge device, wherein the method comprises:

acquiring an image to be recognized, extracting features of the image to be recognized, and obtaining image feature information of the image to be recognized;

sending first information comprising the image feature information to the security enhancement module for the security enhancement module to determine whether there is reference feature information that matches the image to be recognized in a local feature library;

receiving a first determination result sent by the security enhancement module based on that the security enhancement module determines that there is reference feature information that matches the image to be recognized in the local feature library; and based on that the security enhancement module determines that there is no reference feature information that matches the image to be recognized in the local feature library, receiving a first information ciphertext sent by the security enhancement module, and transferring the first information ciphertext to the cloud platform for the cloud platform to determine, based on the first information ciphertext, whether there is reference feature information that matches the image feature information in a cloud feature library-, wherein after transferring the first information ciphertext to the cloud platform, the method further comprises:

receiving a second determination result ciphertext sent by the cloud platform; wherein the second determination result ciphertext is generated by the cloud platform according to the determination result in a case that the cloud platform determines whether there is reference feature information that matches the image feature information in the cloud feature library;

transferring the second determination result ciphertext to the security enhancement module; and receiving a second determination result sent by the security enhancement module; wherein the second determination result is obtained by decrypting the second determination result ciphertext by the security enhancement module.

13. The method according to claim 12, wherein before acquiring the image to be recognized, the method further comprises:

sending a key negotiation request to the cloud platform;

receiving a security key ciphertext sent by the cloud platform, wherein the security key ciphertext is generated by the cloud platform after the cloud platform responds to the key negotiation request and encrypts the security key with a private key of the cloud platform; and sending the security key ciphertext to the security enhancement module for the security enhancement module to decrypt the security key ciphertext with a public key of the cloud platform to obtain the security key, and the security key is used for encrypting the first information and decrypting the second determination result ciphertext.

14. The method according to claim 13, wherein before sending the key negotiation request to the cloud platform, the method further comprises:

sending a device registration request to the cloud platform, the security enhancement module receives and stores a platform certificate generated by the cloud platform in response to the device registration request;

sending an authentication instruction to the security enhancement module for the security enhancement module to generate a module certificate based on the platform certificate; and sending the module certificate received from the security enhancement module to the cloud platform for the cloud platform to perform device authentication.

15. The method according to claim 12, wherein the method further comprises:

detecting a status of the security enhancement module in real time, and sending module status information to the cloud platform according to the status of the security enhancement module, and the module status information is used to represent whether the security enhancement mode is online or not.

16. An electronic device, comprising:

one or more processors;

a memory having one or more programs stored thereon, which, when executed by the one or more processors, cause the one or more processors to implement the method of claim 1;

one or more Input/Output (I/O) interfaces connected between the processors and the memory and configured to enable information interaction between the processors and the memory.

17. A computer-readable non-transitory medium, stored thereon a computer program, when the computer program is executed by a processor, the method of claim 1 is implemented.

* * * * *